(12) United States Patent
Binder

(10) Patent No.: US 10,733,562 B2
(45) Date of Patent: Aug. 4, 2020

(54) METHOD, DEVICE, SYSTEM OF MODEL-DRIVEN ENGINEERING OF EFFICIENT INDUSTRIAL AUTOMATION PROCESS AND BUSINESS PROCESS MODELING WITH BPMN USING NATIVE COMPUTATION OF XML SCHEMAS AND OBJECTS

(71) Applicant: Arkadiusz Binder, Gdansk (PL)

(72) Inventor: Arkadiusz Binder, Gdansk (PL)

( * ) Notice: Subject to any disclaimer, the term of this patent is extended or adjusted under 35 U.S.C. 154(b) by 539 days.

(21) Appl. No.: 15/172,168

(22) Filed: Jun. 3, 2016

(65) Prior Publication Data

US 2017/0351980 A1 Dec. 7, 2017

(51) Int. Cl.
*G06F 16/84* (2019.01)
*G06Q 10/06* (2012.01)
(Continued)

(52) U.S. Cl.
CPC ..... *G06Q 10/067* (2013.01); *G05B 19/41885* (2013.01); *G06F 16/212* (2019.01); *G06F 16/86* (2019.01); *G05B 2219/31229* (2013.01); *G05B 2219/32142* (2013.01); *Y02P 90/22* (2015.11); *Y02P 90/26* (2015.11); *Y02P 90/28* (2015.11); *Y02P 90/86* (2015.11)

(58) Field of Classification Search
CPC .......... G06F 17/2247; G06F 17/30592; G06F 17/30893; G06F 17/30575; G06F 17/30569; G06F 17/30607; G06F 16/86; G06F 16/212; G06Q 10/067; G05B 19/41885; G05B 2219/31229; G05B 2219/32142; Y02P 90/22; Y02P 90/26; Y02P 90/28; Y02P 90/86
See application file for complete search history.

(56) References Cited

U.S. PATENT DOCUMENTS 9,274,811 B1 * 3/2016 Reeves .................... G06F 8/61
9,442,708 B1 * 9/2016 Reeves .................... G06F 8/61
(Continued)

OTHER PUBLICATIONS

OMG, Business Process Model and Notation, Dec. 2013, http://www.omg.org/spec/BPMN, Version 2.0.2, All pages.*

*Primary Examiner* — Jay A Morrison
*Assistant Examiner* — Antonio J Caiado
(74) *Attorney, Agent, or Firm* — Legalforce RAPC Worldwide

(57) ABSTRACT

Disclosed are a method, device and/or system of a model-driven engineering of efficient industrial automation process and business process modeling with BPMN using native computation of XML schemas and objects. In one embodiment, it models a business/industrial automation process using BPMN. It creates an XML schema associated with a business object class in BPMN using XSD and natively computes the XML schema and/or an XML object using a processor and a memory. It generates an XML-transport map and dynamically creates a user interface for the XML schema. It creates the XML object with associated data resource based on the XML schema. It associates the XML object with a business object/industrial automation object. It customizes and/or processes the XML object using the user interface associated with the XML schema according to the characteristics of the business/industrial automation object.

20 Claims, 8 Drawing Sheets

(51) Int. Cl.
*G05B 19/418* (2006.01)
*G06F 16/21* (2019.01)

(56) References Cited

U.S. PATENT DOCUMENTS

| | | | | |
|---|---|---|---|---|
| 9,946,585 | B1* | 4/2018 | Wookey | H05K 999/99 |
| 2003/0140308 | A1* | 7/2003 | Murthy | G06F 17/30917 |
| | | | | 715/234 |
| 2005/0044197 | A1* | 2/2005 | Lai | G06Q 10/10 |
| | | | | 709/223 |
| 2007/0005618 | A1* | 1/2007 | Ivanov | G06Q 10/00 |
| 2007/0165625 | A1* | 7/2007 | Eisner | G06F 9/546 |
| | | | | 370/389 |
| 2010/0122188 | A1* | 5/2010 | Brun | G06F 17/30893 |
| | | | | 715/763 |
| 2014/0280370 | A1* | 9/2014 | Oberle | G06F 8/51 |
| | | | | 707/803 |
| 2014/0344781 | A1* | 11/2014 | Andres | G06F 9/45508 |
| | | | | 717/115 |
| 2018/0005123 | A1* | 1/2018 | Lagos | G06Q 10/067 |

* cited by examiner

METHOD, DEVICE, SYSTEM OF MODEL-DRIVEN ENGINEERING OF EFFICIENT INDUSTRIAL AUTOMATION PROCESS AND BUSINESS PROCESS MODELING WITH BPMN USING NATIVE COMPUTATION OF XML SCHEMAS AND OBJECTS

FIELD OF TECHNOLOGY

This disclosure relates generally to business process modeling and, more particularly, to a method, a device and/or a system of model-driven engineering of efficient industrial automation process and business process modeling with Business Process Model and Notation (BPMN) using native computation of eXtensible Markup Language (XML) schemas and objects.

BACKGROUND

Business process management (BPM) is a field in operations management that focuses on improving corporate performance by managing and optimizing a company's business processes. It can therefore be described as a "process optimization process." It is argued that BPM enables organizations to be more efficient, more effective and more capable of change than a functionally focused, traditional hierarchical management approach. These processes can impact the cost and revenue generation of an organization.

As a policy-making approach, BPM sees processes as important assets of an organization that must be understood, managed, and developed to announce value-added products and services to clients or customers. This approach closely resembles other total quality management or continual improvement process methodologies and BPM proponents also claim that this approach can be supported, or enabled, through technology. As such, many BPM articles and scholars frequently discuss BPM from one of two viewpoints: people and/or technology.

Business Process Model and Notation (BPMN) is a standard for business process modeling that provides a graphical notation for specifying business processes in a Business Process Diagram (BPD), based on a flowcharting technique very similar to activity diagrams from Unified Modeling Language (UML). The objective of BPMN is to support business process management, for both technical users and business users, by providing a notation that is intuitive to business users, yet able to represent complex process semantics. The BPMN specification also provides a mapping between the graphics of the notation and the underlying constructs of execution languages, particularly Business Process Execution Language (BPEL).

The primary goal of BPMN is to provide a standard notation readily understandable by all business stakeholders. These include the business analysts who create and refine the processes, the technical developers responsible for implementing them, and the business managers who monitor and manage them. Consequently, BPMN serves as a common language, bridging the communication gap that frequently occurs between business process design and implementation.

Computers with sets of instructions may often be employed in BPMN to help to monitor and optimize business processes. A set of instructions (software) may often be custom created for a particular business process. Whenever the business process changes (e.g., an old machine being disposed of, a new machine added, a new worker hired, an existing worker retired, etc.), the custom software may become outdated and may need to be re-written. Such software modification may be expensive and may take significant time. An out-date software may not be optimized and the less than optimized business processes may lead to lower resource utilization, lower production and logistical efficiency, higher worker fatigue, higher wastage, and ultimately lower profit margin.

SUMMARY

Disclosed are a method, device, and/or a system of a model-driven engineering of efficient industrial automation process and business process modeling with BPMN using native computation of XML schemas and objects.

In one aspect, it is a method that natively computes an eXtensible Markup Language (XML) schema and/or an XML object using a set of instructions executed through a processor of a quality system using a memory of the quality system communicatively coupled with the processor. It generates an XML-transport map based on the XML schema, and dynamically creates a user interface for any object type through the XML-transport map. It creates the XML object with associated data resource based on the XML schema. It prepares a transaction for the XML object by saving the XML object and utilizing a transaction-save-function to evaluate an identification data of the XML object to determine that the XML object is referenced properly after saving. It saves the XML object to a relational database, in which a number of tables are used for such XML Schema Definition (XSD) elements including a complex type element, a sequence, a referenced element, a referenced attribute, and/or a simple type element.

The method may access the XML object based on a schema prefix, an element name, and/or the identification data using the XML-transport map. It may develop some custom notations based on a Business Process Model and Notation (BPMN) methodology. The BPMN custom notations may have associations to eXtensible Stylesheet Language (XSL) transformations which may be considered like-in database triggers. It may associate the XSD elements to BPMN tasks using an XPath notation. It may decide which part of the XML object is to be readable, which part to be editable, and/or which part to be created in which user-task. It may generate a special engine based on a XSD schema object structure comprising depressions, references, occurrences, restrictions, and/or derivations. It may also generate the special engine based on an amount of data and/or a number of user interactions as a result of a weighted algorithm which considers each of these factors when generating the special engine.

The method may provide a user interface based on association type features of the BPMN methodology. It may permit a user to create a new object of an object type that is referenceable to the XML object. It may permit a user to create another new object of an object type that is used by the XML object. It may perform a search based on an Access Control List (ACL) object-read in the BPMN methodology available to users. When the XML object has XSD choice elements, it may provide a dynamically changing GUI option to the user interface to adjust optional content. When the XML object is recursive, it may make the XML object dynamically appear after filling parent-object before saving to the transaction.

A schema element may be identified by a unique element identifier. An optional name transposing may be performed with a schema prefix namespace to address a resource storing database, and/or the unique element identifier to address an atomic object.

In another aspect, it is a method that models a business process and/or an industrial automation process using a Business Process Model and Notation (BPMN) methodology. It associates a business object class in the BPMN methodology with an XML schema. It creates the XML schema using XML Schema Definition (XSD). It natively computes the XML schema and/or an XML object using a set of instructions executed through a processor of a quality system using a memory of the quality system communicatively coupled with the processor. It generates an XML-transport map based on the natively computed XML schema. It dynamically creates a user interface for the XML schema through the XML-transport map. It also creates the XML object with associated data resource based on the XML schema. It associates the XML object with a business object and/or an industrial automation object. It customizes and/or processes the XML object using the user interface associated with the XML schema according to the characteristics of the business object and/or the industrial automation object.

The method may model a business transaction of the business object and/or an industrial automation object with an XML transaction associated with the XML object. It may prepare the XML transaction for the XML object by saving the XML object and utilizing a transaction-save-function to evaluate an identification data of the XML object to determine that the XML object is referenced properly after saving. It may save the XML object to a relational database, in which a number of tables may be used for such XSD elements including a complex type element, a sequence, a referenced element, a referenced attribute, and/or a simple type element.

The method may create quality documentation based on the business process, with the associated business object modeled by the XML object and a business resource modeled by the data resource associated with the XML object. The method may also create quality documentation based on the industrial automation process, with the associated industrial automation object modeled by the XML object and an industrial automation resource modeled by the data resource associated with the XML object. It may revitalize and control the XML object and the associated data resource.

When the business process is changed with a modified business object and a modified business resource, the method may modify the XML object and the associated data resource. When the industrial automation process is changed with a modified industrial automation object and a modified industrial automation resource, the method may modify the XML object and the associated data resource. It may create a second XML object based on the XML schema when the business process is changed with a new business object. It may also create a second XML object based on the XML schema when the industrial automation process is changed with a new industrial automation object. It may associate the second XML object with a second data resource. It may also associate the second XML object of the business object class with the new business object and/or the new industrial automation object.

It may reference the second XML object with the second data resource to the XML object with the data resource. It may initialize the second XML object based on the XML object. It may initialize the second data resource based on the data resource. It may also create the second XML object with the second data resource by copying the XML object with the data resource. It may control the XML object with the data resource and the second XML object with the second data resource jointly. It may modify a relationship database with a new table, a new column and/or a new row to allow association to new XML object and new data resource.

In yet another aspect, it is a quality system with a processor, a memory communicatively coupled with the processor, and a set of instructions to be executed through the processor using the memory. Under the set of instructions, the system models a business process using a Business Process Model and Notation (BPMN) methodology. It associates a business object class of the business process in the BPMN methodology with an XML schema, and creates the XML schema using XML Schema Definition (XSD). It natively computes the XML schema and/or any associated XML objects. It generates an XML-transport map based on the natively computed XML schema, and dynamically creates a user interface for the XML schema through the XML-transport map.

The quality system creates an XML object with associated data resource based on the XML schema. It associates the XML object with a business object of the business object class. It also associates the data resource with a business resource associated with the business object. It customizes and/or processes the XML object using the user interface associated with the XML schema according to the characteristics of the business object. It modifies the XML object and the associated data resource when the business process is changed with a modified business object and a modified business resource. It also creates a second XML object based on the XML schema when the business process is changed with a new business object.

The quality system may initialize the second XML object based on the XML object. The quality system may initialize the second data resource based on the data resource. It may also reference the second XML object with a second data resource to the XML object with the data resource. It may modify a relational database with a new table, a new column and/or a new row to allow association to the second XML object and the second data resource.

BRIEF DESCRIPTION OF THE FIGURES

The embodiments of this disclosure are illustrated by way of example and not limitation in the Figures of the accompanying drawings, in which like references indicate similar elements and in which.

Figure 1:
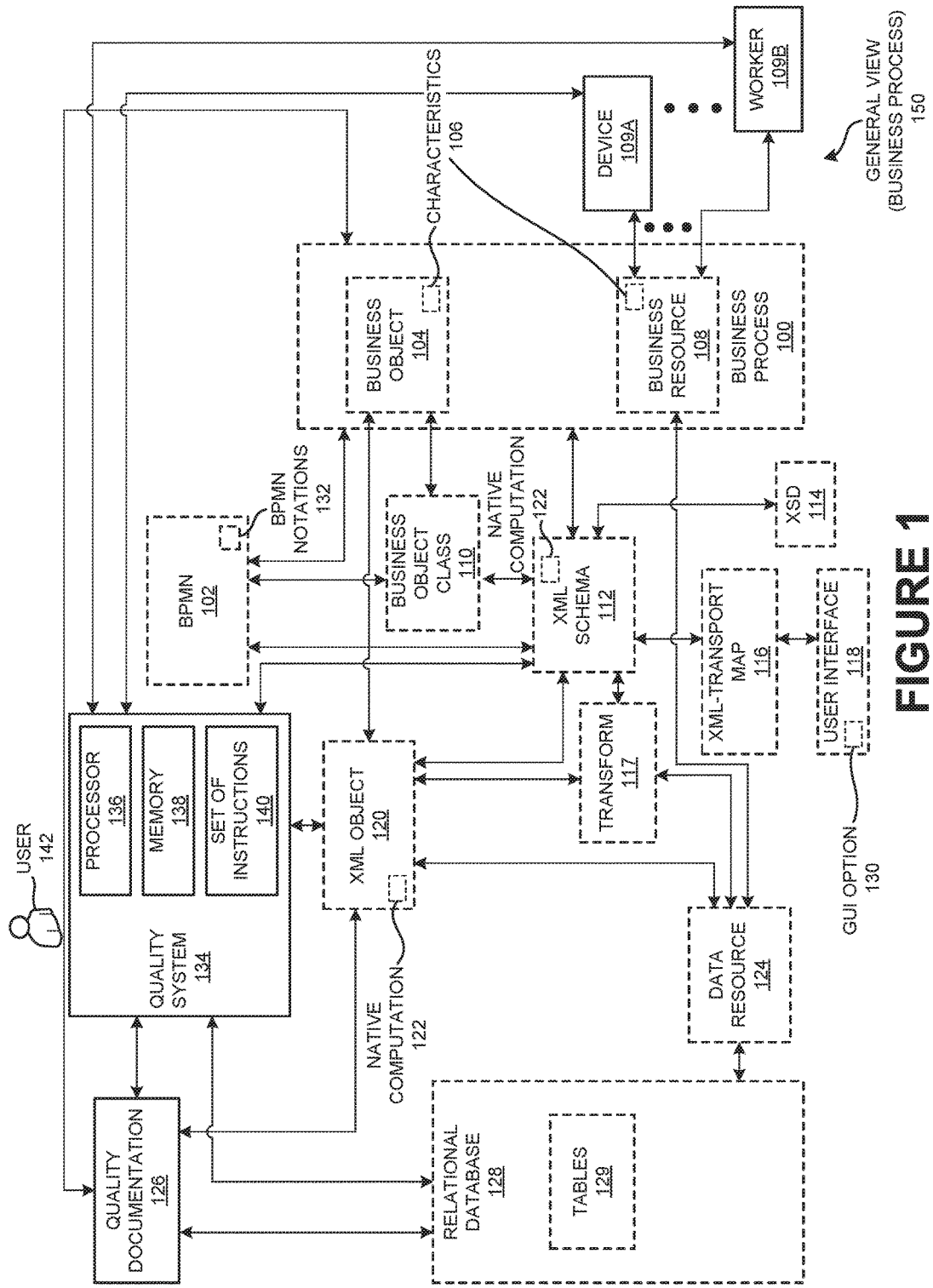
FIG. 1 is a general view of a business process modeled with BPMN by creating an XML object from an XML schema to model a business object and a data resource to model a business resource using native computation, according to one embodiment.

Other features of the present embodiments will be apparent from accompanying drawings and from the disclosure that follows.

DETAILED DESCRIPTION

Disclosed are a method, device, and/or a system of a model-driven engineering of efficient industrial automation process and business process modeling with BPMN using native computation of XML schemas and objects.

In one embodiment, it is a method that natively computes (e.g., using native computation 122 of the quality system 134) an eXtensible Markup Language (XML) schema 112 and/or an XML object 120 using a set of instructions 140 executed through a processor 136 of a quality system 134 using a memory 138 of the quality system 134 communicatively coupled with the processor 136. It generates an XML-transport map 116 based on the XML schema 112, and dynamically creates a user interface 118 for any object type through the XML-transport map 116. It creates (e.g., using create/delete 314 of the quality system 134) the XML object 120 with associated data resource 124 based on the XML schema 112. It prepares a transaction 318 for the XML object 120 by saving the XML object 120 and utilizing a transaction-save-function (e.g., transaction save 320 of the quality system 134) to evaluate an identification data 604 of the XML object 120 to determine that the XML object 120 is referenced (e.g., using reference 324 of the quality system 134) properly after saving. It saves (e.g., using save/read 328 of the quality system 134) the XML object 120 to a relational database 128, in which a number of tables 129 are used for such XML Schema Definition (XSD) 114 elements including a complex type element, a sequence, a referenced element, a referenced attribute, and/or a simple type element.

The method may access 308 the XML object 120 based on a schema prefix 600, an element name 602, and/or the identification data 604 using the XML-transport map 116. It may develop some custom notations (e.g., BPMN notations 132) based on a Business Process Model and Notation (BPMN 102) methodology. The BPMN custom notations (e.g., BPMN notations 132) may have associations to eXtensible Stylesheet Language (XSL) transformations (using transform 117 of the quality system 134) which may be considered like-in database triggers. It may associate the XSD 114 elements to BPMN 102 tasks using an XPath notation. It may associate a business object class 110 in the BPMN 102 methodology with an XML schema. It may associate the XML object 120 to a business object 104. It may associate the data resource 124 to a business resource 108.

It may decide which part of the XML object 120 is to be readable (e.g., atomic object(s) 606 of readable part(s) 608 of the XML object 120), which part to be editable (e.g., atomic object(s) of editable part(s) 610 of the XML object 120), and/or which part to be created in which user-task (e.g., atomic object(s) created by user1 in task1 612 and/or created by user2 in task2 614 of the XML object 120).

It may generate a special engine 700 based on a XSD schema object structure 704 comprising depression(s) 706, reference(s) 708, occurrence(s) 710, restriction(s) 712, and/or derivation(s) 714. It may also generate the special engine 700 based on an amount of data and/or a number of user interactions as a result of a weighted algorithm 720 which considers each of these factors when generating the special engine 700.

The special engine 700 may be a set of instructions 140 to be executed through a processor 136 of the quality system 134 using a memory 138 of the quality system 134 communicatively coupled with the processor 136. The special engine 700 may be a software written in programming languages such as C, Python, php, Java, etc. The special engine 700 may support native computation (e.g., native computation 122). The special engine 700 may support native computation 122 of the XML object 120 and/or the native computation 122 of the XML schema 112. The special engine 700 may be obtained by transformation (e.g., transform 117) applied to XSD elements (e.g., elements of XSD 114).

The method may provide a user interface 118 based on association type features of the BPMN 102 methodology. It may permit a user 142 to create a new object of an object type that is referenceable (e.g., using reference 324 of the quality system 134) to the XML object 120. It may permit a user 142 to create another new object of an object type that is used by the XML object 120. It may perform a search 304 based on an Access Control List (ACL) object-read in the BPMN 102 methodology available to users 142. When the XML object 120 has XSD 114 choice elements, it may provide a dynamically changing GUI option (e.g., GUI option 130) to the user interface 118 to adjust optional content. When the XML object 120 is recursive, it may make the XML object 120 dynamically appear 326 after filling parent-object before saving to the transaction 318.

A schema element may be identified by a unique element identifier. An optional name transposing may be performed with a schema prefix namespace to address a resource storing database, and/or the unique element identifier to address an atomic object 606.

In another embodiment, it is a method that models a business process 100 and/or an industrial automation process 200 using a Business Process Model and Notation (BPMN 102) methodology. It associates a business object class 110 in the BPMN 102 methodology with an XML schema 112. It creates (e.g., using create/delete 314 of the quality system 134) the XML schema 112 using XML Schema Definition (XSD) 114. It natively computes (e.g., using native computation 122 of the quality system 134) the XML schema 112 and/or an XML object 120 using a set of instructions 140 executed through a processor 136 of a quality system 134 using a memory 138 of the quality system 134 communicatively coupled with the processor 136. It generates an XML-transport map 116 based on the natively computed XML schema 112. It dynamically creates a user interface 118 for the XML schema 112 through the XML-transport map 116. It also creates the XML object 120 with associated data resource 124 based on the XML schema 112. It associates the XML object 120 with a business object 104 and/or an industrial automation object 202. It customizes (e.g., using customize 300 of the quality system 134) and/or processes the XML object 120 using the user interface 118 associated with the XML schema 112 according to the characteristics 106 of the business object 104 and/or the industrial automation object 202.

The method may model a business transaction of the business object 104 and/or a transaction of an industrial automation object 202 with an XML transaction 318 associated with the XML object 120. It may prepare the XML transaction 318 for the XML object 120 by saving the XML object 120 and utilizing a transaction-save-function (e.g., transaction save 320 of the quality system 134) to evaluate an identification data 604 of the XML object 120 to determine that the XML object 120 is referenced (e.g., using reference 324 of the quality system 134) properly after saving. It may save 328 the XML object 120 to a relational database 128, in which a number of tables 129 may be used for such XSD 114 elements including a complex type element, a sequence, a referenced element, a referenced attribute, and/or a simple type element.

The method may create quality documentation 126 based on the business process 100, with the associated business object 104 modeled by the XML object 120 and a business resource 108 modeled by the data resource 124 associated with the XML object 120. The method may also create the quality documentation 126 based on the industrial automation process 200, with the associated industrial automation object 202 modeled by the XML object 120 and an industrial automation resource 204 modeled by the data resource 124 associated with the XML object 120. It may revitalize 306 and control 310 the XML object 120 and the associated data resource 124.

When the business process 100 is changed with a modified business object 104 and a modified business resource 108, the method may modify (e.g., modify/copy 316 of the quality system 134) the XML object 120 and the associated data resource 124. When the industrial automation process 200 is changed with a modified industrial automation object 202 and a modified industrial automation resource 204, the method may modify the XML object 120 and the associated data resource 124. It may create a second XML object 402 based on the XML schema 112 when the business process 100 is changed with a new business object 400. It may also create the second XML object 402 based on the XML schema 112 when the industrial automation process 200 is changed with a new industrial automation object 500. It may associate the second XML object 402 with a second data resource 404. It may also associate the second XML object 402 of the business object class 110 with the new business object 400 and/or the new industrial automation object 500.

It may reference (e.g., using reference 324 of the quality system 134) the second XML object 402 with the second data resource 404 to the XML object 120 with the data resource 124. It may initialize the second XML object 402 based on the XML object 120. It may initialize the second data resource 404 based on the data resource 124. It may also create the second XML object 402 with the second data resource 404 by copying the XML object 120 with the data resource 124. It may perform operations (e.g., customize 300, revitalize 306, access 308, control 310, navigate 311, rebuild/refresh 312, create/delete 314, modify/copy 316, do transaction 318, transaction save 320, test 322, reference 324, save/read 328, etc.) on the XML object 120 and the second XML object 402 jointly. It may perform operations (e.g., customize 300, revitalize 306, access 308, control 310, navigate 311, rebuild/refresh 312, create/delete 314, modify/copy 316, do transaction 318, transaction save 320, test 322, reference 324, save/read 328, etc.) on the data resource 124 and the second data resource 404 jointly. Similarly, it may modify a relational database 128 with a new table 406, a new column and/or a new row to allow association to new XML object(s) (e.g., second XML object 402) and new data resource(s) 124 (e.g., second data resource 404).

In yet another embodiment, it is a quality system 134 with a processor 136, a memory 138 communicatively coupled with the processor 136, and a set of instructions 140 to be executed through the processor 136 using the memory 138. Under the set of instructions 140, the system models a business process 100 using a Business Process Model and Notation (BPMN 102) methodology. It associates a business object class 110 of the business process 100 in the BPMN 102 methodology with an XML schema 112, and creates the XML schema 112 using XML Schema Definition (XSD) 114. It natively computes (e.g., using native computation 122 of the quality system 134) the XML schema 112 and/or any associated XML objects (e.g., XML object 120). It generates an XML-transport map 116 based on the natively computed XML schema 112, and dynamically creates a user interface 118 for the XML schema 112 through the XML-transport map 116.

The quality system 134 creates an XML object 120 with associated data resource 124 based on the XML schema 112. It associates the XML object 120 with a business object 104 of the business object class 110. It also associates the data resource 124 with a business resource 108 associated with the business object 104. It customizes (e.g., using customize 300 of the quality system 134) and/or processes the XML object 120 using the user interface 118 associated with the XML schema 112 according to the characteristics 106 of the business object 104. It modifies the XML object 120 and the associated data resource 124 when the business process 100 is changed with a modified business object 104 and a modified business resource 108. It also creates a second XML object 402 based on the XML schema 112 when the business process 100 is changed with a new business object 400.

The quality system 134 may initialize the second XML object 402 based on the XML object 120. The quality system 134 may initialize the second data resource 404 based on the data resource 124. It may also reference (e.g., using reference 324 of the quality system 134) the second XML object 402 with a second data resource 404 to the XML object 120 with the data resource 124. It may modify a relational database 128 with a new table 406, a new column and/or a new row to allow association to the second XML object 402 and/or the second data resource 404.

FIG. 1 is a general view 150 of a business process 100 modeled with BPMN 102 by creating an XML object 120 from an XML schema 112 to model a business object 104 and a data resource 124 to model a business resource 108 using native computation 122, according to one embodiment.

Particularly, FIG. 1 illustrates a business process 100, a BPMN 102, a business object 104, a characteristics 106, a business resource 108, a device 109A, a worker 109B, a business object class 110, an XML schema 112, an XSD 114, an XML-transport map 116, a transform 117, a user interface 118, an XML object 120, a native computation 122, a data resource 124, a quality documentation 126, a relational database 128, tables 129, a GUI option 130, a BPMN notation 132, a quality system 134, a processor 136, a memory 138, a set of instructions 140 and a user 142.

The business process 100 may be a collection of related, structured activities or tasks that produce a specific service and/or a product (e.g., to serve a particular goal) for a particular customer (e.g. user 142) and/or customers.

Examples of business process 100 may include receiving orders, invoicing, shipping products, updating employee information, setting a marketing budget, etc. Business process 100 may occur at all levels of an organization's activities and may include events that the customer (e.g., user 142) sees and events that are invisible to the customer (e.g., user 142).

The business process 100 may be visualized as a flowchart of a sequence of activities with interleaving decision points or as a Process Matrix of a sequence of activities with relevance rules based on data in the process. The business process 100 may include management processes, operational processes and supporting processes. Management processes may be processes that govern the operation of a system (e.g., corporate governance, strategic management, etc.). Operational processes may constitute the core business and may create the primary value stream (e.g., taking orders from customers, opening an account in a bank branch, etc.). Supporting processes may support the core processes (e.g., health and safety, accounting, recruitment, call center, technical support, etc.). The business process(es) 100 may be an amalgam of all the separate steps towards accomplishing specific organizational goals.

The business process 100 may begin with a mission objective and may end with achievement of the business objective. The business process 100 may be complex and may be decomposed into several sub-processes (e.g., business process 100), which have their own attributes, but also contribute to achieving the goal of the super-process. The division of a business process 100 into sub-processes may be used to model division of labor. The division of a business process 100 into sub-processes may model how work (process) may be divided into a set of simple tasks (sub-processes) which may be performed by different specialized workers (e.g., worker 109B with certain skill set) with different specialized resources (e.g., device 109A, material, tool, equipment, energy source, time, timing, etc.).

The analysis of business processes (e.g., business process 100) may include the mapping of processes and subprocesses down to activity/task level. Business processes (e.g., business process 100) may be designed to add value(s) for customer(s) and/or may not include unnecessary activities. The outcome of well-designed business processes (e.g., business process 100) may be increased effectiveness (value for customer(s)) and increased efficiency (less use of resources (e.g., business resource 108)). The modeling of business process 100 may support/enable/allow scientific management, knowledge management, total quality management, outsourcing, business process management, and/or business process reengineering. Business processes (e.g., business process 100) may be modeled through many methods and techniques.

One example may be BPMN 102 (Business Process Modeling Notation) which may be a Business Process Modeling (BPM) technique that can be used for drawing business processes (e.g., business process 100) in a workflow which is the movement of information or material from one activity and/or worksite to another. Workflow may include procedures, people and/or tools involved in each step of a business process (e.g., business process 100), an industrial automation process and/or other process. A single workflow may either be sequential, with each step contingent upon completion of the previous one. A single work may also be parallel, with multiple steps occurring simultaneously. Multiple combinations of single workflows may be connected to achieve a resulting overall process.

Business process management (BPM) may include how to study, identify, change and/or monitor business processes to ensure they run smoothly and may be improved over time. It may be a continuous evaluation of existing processes, and an identification of ways to improve upon them, resulting in a cycle of overall organizational improvement.

The BPMN 102 (Business Process Model and Notation) may be a graphical representation for specifying business processes (e.g., business process 100) in a business process model. The BPMN 102 may be a standard for business process modeling that provides a graphical notation for specifying business processes in a Business Process Diagram (BPD), based on a flowcharting technique very similar to activity diagrams from Unified Modeling Language (UML). The BPMN 102 may be a standard developed by Business Process Management Initiative (BPMI) and/or maintained by the Object Management Group since the two organization merged in 2005. The objective of BPMN 102 may be to support business process management, for both technical users 142 and/or business users 142, by providing a notation that is intuitive to business users 142, yet able to represent complex process semantics. The BPMN 102 specification may also provide a mapping between the graphics of the notations and the underlying constructs of execution languages, particularly Business Process Execution Language (BPEL). The BPMN 102 may also be a graphical representation for specifying industrial automation processes in an industrial automation process model, and/or other processes in other process models. The graphical representation of BPMN 102 may include graphical elements such as events, activities, gateways and/or connections. The BPMN 102 may include these basic element categories: flow objects (e.g., events, activities, gateways, etc.), connecting objects (e.g., sequence flow, message flow, association, etc.), swim lanes (e.g., pool, lane, etc.), and/or artifacts (e.g., data object, group, annotation, etc.). The BPMN 102 may include organizational structures, functional breakdowns and/or data models. The BPMN 102 may show the flow of data and/or messages. The BPMN 102 may associate data artifacts to activities. The BPMN 102 may also be a data flow diagram.

The BPMN 102 may include a systematic, theoretical analysis of the methods applied to the field of study of business processes 100. The BPMN 102 may include the theoretical analysis of the body of methods and principles associated with business process 100. The BPMN 102 may provide a standard, easy-to-read technique and/or a system to define and analyze public and/or private business process 100. Further, the BPMN 102 may provide a standard notation procedure that is readily understandable by management personnel, analysts and developers and help bridge communication gaps that may often exist between the various departments within an organization and/or enterprise. The BPMN 102 may provide a common graphical tool set to help to ensure that XML (Extensible Markup Language) documents designed for the execution of diverse business process(es) 100 can be visualized with a common notation.

The business object 104 may be a representation of a thing active in the business domain and/or a business process 100, including a business name and definition, attributes, behavior, relationships and/or constraints. A business object 104 may represent, for example, a person, place and/or a concept. The representation may be in a natural language, a modeling language, and/or a programming language. In another embodiment, the business object 104 may be an entity within a multi-tiered software application that works in conjunction with Data Access and Business Logic Layers to transport data.

A business object 104 may be an actor within the business layer of a layered object-oriented computer program that represents a part of a business and/or an item within it. Business object(s) 104 may enable designers to design software in manageable pieces by breaking the business down into a modular form and separating each function into a software object so that as development progresses, increasing complexity can be added without huge changes to the other objects. A business object 104 may take the form of a data array but is not a database itself. The business object 104 may represent business entities such as an invoice, a transaction and/or a person. Business object(s) 104 may be inherently scalable due to the architecture of object-oriented software applications (e.g., quality system 134).

A business object 104, when used in object-oriented programming, may be a representation of parts of a business. The business object 104 may represent, for example, a person, place, event, business process, or concept and exist as for example an invoice, a product, a transaction and/or even details of a person. Although classes may contain executing or management behaviors, a business object 104 may be inert holding sets of instance variables and/or properties.

In another example embodiment, the business object 104 may be a variable, a data structure, and/or a function of a business process 100, and as such, is a location in memory having a value and possibly referenced by an identifier used to hold the data and/or manipulate the data.

The business resource 108 may be an economic or productive factor required to accomplish a commercial, industrial, and/or professional activity, or means to undertake an enterprise and achieve desired outcome. The business resource 108 may be human resource (e.g., worker 109B, manager, skilled worker, trained personnel in legal, economic, financial, technical, safety, organizational, logistical, and/or other matters), financial resource (e.g., credit line, cash, account receivable, etc.), physical (e.g., materials, equipment, computing machines, tools, asset, device 109A, energy, natural resources, services, etc.), and/or knowledge factors (e.g., information, information system, platform, technology, skill sets, expertise, training) that provide a firm the means to perform its business processes (e.g., business process 100).

The characteristics 106 may be distinguishing features and/or attributes of business object(s) 104 and/or business resource(s) 108. Every business object 104 and/or business resource 108 may have characteristics 106 that describe it. In an example embodiment, business object(s) 104 and/or business resource(s) 108 may be workers, skilled workers, customers, employees, students, and suppliers having characteristics 106, such as names, addresses, phone numbers, birthdays, heights, weights, educational background, working experience, skill sets, years of service, and so on. Business object(s) 104 and/or business resource(s) 108 may be product(s) having characteristics 106 such as names, prices, descriptions, weight, quantity, storage location, installed location, accessories/consumable needed/installed/left, maintenance/repair history/schedule, and so on. Business object 104 may be business functionalities such as verify user ID, user daily check in, user daily check out, load material to tools/devices/machinery, generate/print/copy/scan/archive document, operate tool/device/machinery, etc., each of which may have characteristics such as location, duration, operating hours, required business resource 108, etc. Business object(s) may be an appointment(s) having characteristics 106 such as times, dates, and so on. The characteristics 106 of business objects 104 may be converted into the attributes of entities in the logical design stage. Attributes, in turn, may ultimately be translated into table fields (e.g. fields in tables 129).

The business object class 110 may include classes and/or categories of business object(s) 104 with certain attributes. Multiple business objects 104 may belong to the same business object class 110. The business object class 110 may be an entity within a multi-tiered software application that works in conjunction with the Data Access and Business Logic Layers to transport data. In one example embodiment, the business object class 110 may be a static piece of code that consists of attributes of the business object 104 that does not change during the execution of a program.

Every entity in the system, representing the human-world object which the system (e.g., quality system 134) is expected to interact with, may be a business object 104 and/or a business resource 108.

Whereas a computer program/software/application may implement classes which typically end in objects managing or executing behaviors, a business object 104 and/or a business resource 108 may hold a set of instance variables or properties, characteristics 106 and/or attributes, associations with other business objects 104 and/or business resource 108, weaving a map of objects representing the business relationships. A domain model where business objects 104 do not have behavior may be an anemic domain model. Business objects 104 may separate state from behavior because they may be communicated across the tiers in a multi-tiered system, while the real work of the application may be done in the business tier and may not move across the tiers.

The business object class 110 may be an actual written piece of code (e.g. a set of instructions, a computer program, a software, an application) used to define the behavior of a given class of business object 104. The business object class 110 may be a static piece of code that consists of attributes which do not change during the execution of a program. Multiple instances of a class may be instantiated.

The business object 104, however, may refer to an actual instance of a business object class 110. Multiple business objects 104 may be associated with a business object class 110. Every business object 104 may belong to a business object class 110. The business object 104 may be created and eventually destroyed—so they only live in the program for a limited time. While the business object 104 is 'living', their properties may be changed significantly.

The XML schema 112 may be defined based on XSD 114. The XML schema 112 may define the legal building blocks of an XML document, including the elements and attributes that can appear in the XML document, the number of (and order of) child elements, the data types for elements and attributes, and the default and fixed values for elements and attributes. An XML document may be used to define an XML object 120. The XML schema 112 may be used to define legal building blocks of an XML object 120. There may be many standardized XML formats (e.g., HTTP) in daily use in the world. Many of these XML standards may be defined by XML schemas 112.

XML schemas (e.g., XML schema 112) may be XML-based and powerful alternative to DTD. The XML schema 112 may be written in XML and may be edited with XML editor. The XML schema 112 may be parsed by XML parser. The XML schema 112 may be manipulated with XML DOM. The XML schema 112 may be transformed (e.g., applying transform 117) with XSLT. The XML schema 112 may be re-used in other schemas. The XML schema 112 may enable effective communication when XML objects are transmitted and manipulated as all XML objects (e.g., XML object 120) created based on an XML schema 112 has well defined structure and all parties can understand.

The XML schema 112 may be a description of a type and/or a structure of an XML document and/or a program (e.g., an XML object 120), compiled to run with a particular processor (e.g., processor 136) and its set of instructions (e.g., set of instructions 140), typically expressed in terms of constraints on the structure and content of documents of that type, above and beyond the basic syntactical constraints imposed by XML itself. The XML schema 112 may be an XML document. These constraints may generally be expressed using some combination of grammatical rules governing the order of elements, Boolean predicates that the content must satisfy, data types governing the content of elements and attributes, and more specialized rules such as uniqueness and referential integrity constraints. The XML schema 112 may represent the interrelationship between the attributes and elements of an XML object 120 (for example, a document and/or a portion of a document).

In another example embodiment, an XML schema 112 may be a document that describes the valid format of an XML data-set that is intrinsic to a system (e.g., quality system 134) and is supported by the system with minimal computational overhead (e.g., using native computation 122) and/or additional components. The XML schema 112 may include what elements are (and/or are not) allowed at any point, what the attributes for any element may be, and/or the number of occurrences of elements, etc.

The XSD 114 (XML Schema Definition) may be a language to define an XML schema 112. The XSD 114 may be a recommendation that specifies how to formally describe the elements in an Extensible Markup Language (XML) document (e.g., XML schema 112). The XSD 114 may be used to define XML schema 112. This description may be used to verify that each item of content in a document adheres to the description of the element in which the content is to be placed. The XSD 114 may support four kinds of complex elements, namely, empty elements, elements that contain only other elements, elements that contain only text, and elements that contain both other elements and text.

The XML-transport map 116 may allow external programs to communicate with an XML object 120. The XML-transport map 116 may be a mechanism for using HTTP transport in the context of an XML protocol. The XML language may be designed to transport and store data with a focus on what the data is. The XML language has no predefined tags. The XML-transport map 116 may be a file showing the structure of a program (e.g., XML schema 112, XML object 120) after it has been compiled for creating a user interface 118 for any object type. The XML-transport map 116 may list every variable in the program (e.g., XML schema 112) along with its memory address. A map of modules may be created to address schema (e.g., XML schema 112) and bind such schema to automatic Input/Output controller 206 of the quality system 134. There may be single schema-resource file (e.g., data resource 124) which is interpreted as data storage such as any other database object (e.g., XML object 120), that is parsed and relations are calculated by transformation algorithms. The data resource 124 may interpret such schemas and transform it into one logical-system.

The data objects (e.g., XML object 120) may be mapped to proper database system—which is used by method typical for using database engine queries.

The transform 117 may be a transformation of XSD elements, XML object(s) 120 and/or XML schemas 112, which may both be XML documents. The transform 117 may transform XSD elements, XML object(s) 120 and/or XML schema(s) 112 into codes (e.g. a set of instructions, software, program, Java, etc.). The transform 117 may be defined in XSLT (eXtensible Stylesheet Language Transformations) which may be part of XSL (eXtensible Stylesheet Language), which may be a style sheet language for XML. The XSLT may be a W3C recommendation. The transform 117 may transform XML documents (e.g., XML objects 120 and/or XML schemas 112) to XHTML or other documents. The transform 117 may transform an XML document (e.g., XML objects 120) to another XML document (e.g., second XML object 402). In other words, the transform 117 may transform an XML object/schema to a transformed XML object/schema. The transform 117 may transform an XML source tree (of an XML object/schema) into an XML result-tree (of transformed XML object/schema).

The transform 117 may use XPath to navigate through elements and attributes in XML documents (e.g., XML objects 120 and/or XML schemas 112) to find information. In the transformation process, the transform 117 may use XPath to define parts of the source document that should match one or more predefined templates. When a match is found, the transform 117 may transform the matching part of the source document into the result document.

The transform 117 may add/remove elements and/or attributes to or from the XML objects 120 and/or XML schemas 112. The transform 117 may rearrange and/or sort elements of XML objects 120 and/or XML schemas 112. The transform 117 may also perform tests and make decisions about which elements of the XML objects 120 and/or XML schemas 112 to hide and/or display, and/or others.

The user interface 118 may be a formatted document created for any object type containing fields that users 142 can fill in. The fields may be empty, and/or may be editable but preloaded with initial suggested entry. The user interface 118 may have fields that change dynamically in number, appearance, size, color, and/or any number of aspects. Entire sections of the form can appear, disappear, and/or repeat any number of times. The user interface 118 may have a series of fields that are variable, and driven by a runtime logic.

The XML object 120 may be an object defined in the eXtensible Markup Language (XML). The XML object 120 may be designed to store and/or transport data. The XML object 120 may be created based on the XML schema 112. The XML object 120 may be designed to be both human- and machine-readable. The XML object 120 may include a markup language variable, data structure, and/or a function, that defines a set of rules for encoding documents in a format which is both human-readable and machine-readable and as such, is a location in memory having a value and possibly referenced by an identifier.

The native computation 122 may be software and/or data formats defined/implemented in machine language, assembly language and/or, C, C++, Python, PHP language for efficient execution. The native computation 122 may incur minimal computational requirement and/or additional components. The use of native computation 122 may require fewer software layers to create XML schema 112.

The native computation 122 may enable fast and/or low power implementation.

The data resource 124 may be data-related resources (e.g., storage, directories, files, RAM, ROM, application, software, hardware, hard disk, bandwidth, network resources, computing resources, etc.) used by the XML object 120. The data resource 124 may be a component of information technology infrastructure that represents all the data available to an organization, whether they are automated or non-automated. The data resource 124 may encompass all its representation of each and every single data available to an organization.

The quality documentation 126 may be information in reproducible format that is useful in the operation for an organization to implement business process 100. The quality documentation 126 of the quality system 134 may include textual and/or pictorial descriptions of one or more of business process 100, quality system 134, BPMN 102, BPMN notation 132, business object 104, characteristics of business object 104, business object class 110, XML object 120, XML schema 112, XSD 114, native computation 122, transform 117, business resource 108, device 109A, worker 109B, data resource 124, relational database 128, tables 129, XML-transport map 116, user interface 118, and/or GUI option 130. The quality documentation 126 may include descriptions of graphical procedures, policies and/or instructions regarding what an organization plans to do and how it will be accomplished. The quality documentation 126 may instruct employees how to perform tasks.

The quality documentation 126 may provide employees with the official "company way" of performing their tasks as related to ensuring product quality. Next, the quality documentation 126 may be very useful in simplifying complex (and, thereby, error-prone) processes (e.g., business process 100). The quality documentation 126 may be used to supplement employee training. It may provide a basis for comparing what is required and what is actually done. The quality documentation 126 may be audited to verify compliance. It may be an excellent source of objective evidence for the auditor. The quality documentation 126 may also provide a method of evaluating the quality system performance of suppliers and sub-tier suppliers to ensure the best provider of quality material and products is selected.

The relational database 128 may be a collection of data items organized as a set of formally-described tables (e.g., tables 129) from which data can be accessed and/or reassembled in many different ways without having to reorganize the database tables. The relational database 128 may include a set of tables (e.g., tables 129) containing data fitted into predefined categories. Each table (e.g., tables 129, which is sometimes called a relation) may contain one or more data categories in columns. Each row of the table (e.g., tables 129) may contain a unique instance of data for the categories defined by the columns. Every table (e.g., tables 129) of the relational database 128 may share at least one field with another table in 'one to one,' 'one to many,' or 'many to many' relationships. These relationships may allow the database user (e.g., user 142 of quality system 134) to access the data in almost an unlimited number of ways, and to combine the tables 129 as building blocks to create complex and very large databases.

The data access layer of relational database 128 may know how to persist and retrieve a business object 104. For example, if a user (e.g., user 142 of quality system 134) has a shopping cart item, the data access layer may know what table (e.g., tables 129) that item goes in, what properties are to be stored in what fields. And when the user (e.g., user 142 of quality system 134) wants to examine the items, the data access layer may know what tables (e.g., tables 129) to get them from and may create .net objects that have all the relevant property set. The business logic layer of the relational database 128 may help to make "business decisions".

In one example embodiment, the business code may just be about implementing rules and logic that runs the system (e.g., quality system 134). The data access may read and write the objects (e.g., business objects 104) to a data store. All the business objects 104 using the tables 129 may automatically get the updated versions of the tables 129.

The tables 129 (e.g., a file) may organize information about a single topic into rows and columns. A database (e.g., relational database 128) for a business may typically contain a table (e.g., tables 129) for customer information. Each single piece of data (e.g., account number) is a field in the table (e.g., tables 129). A column consists of all the entries in a single field. Fields, in turn, are organized as records, which are complete sets of information The GUI option 130 may be an alternative mean provided in the user interface 118 to select, customize, enable and/or disable attributes and/or elements (e.g., an XML object 120 created based on an XML schema 112 with XSD 114 choice elements) that may be customizable and/or optional.

The BPMN notation 132 may be notations used in a graphical representation for specifying business processes in a business process model. The BPMN notation 132 may include elements used to describe workflow in a business process model. The BPMN notations 132 may include flow objects (e.g. events, activities, gateways, etc.), connecting objects (sequence flow, message flow, association, etc.), swim lanes (e.g. pool, lane, etc.), artifacts (data object, group, annotation, etc.). The BPMN notation 132 may include circle, diamond, rectangles, lines, directed lines, dotted lines, etc. The BPMN notation 132 may signify task, subprocess, transaction, call activity, start, end, data, groups, decisions, alternative flow, branch, merging, sequence flow, message flow, association, synchronization, inclusive, exclusive, complex, event based, parallel process, etc.

The BPMN notation 132 may provide businesses with the capability of understanding internal business procedures in a graphical notation and may give organizations the ability to communicate these business procedures in a standard manner. Furthermore, the graphical notation may facilitate the understanding of the performance collaborations and business transactions between the organizations. BPMN notation 132 may ensure that businesses understand themselves and participants in their business and may enable organizations to adjust to new internal and business to business circumstances quickly.

The quality system 134 may be a collection of elements or components that are organized for a common purpose of achieving business goals by consistently monitoring, testing, simulating, enhancing business process(es) 100 using BPMN 102. The quality system 134 may include a processor 136, a memory 138 and a set of instructions 140. The quality system 134 may also include a display, a monitor, a user interface, a sensor, a network, a cloud, another interface, a printer, a backup system, and/or a security system, etc.

The quality system 134 may be connected to one or more devices/machines/tools (e.g., device 109A) to monitor work progress, and status of business resource 108 in the business process 100. The quality system 134 may be monitoring the activities, work progress and productivity of one or more staffs and workers (e.g., worker 109B) for the sake of the business process 100 and the associated modeling. The quality system 134 may direct all controllable elements (e.g., device 109A and worker 109B) in the business process 100 to adapt and/or function in ways to optimize the business process 100.

The data resource 124 associated with quality system 134 may allow user (e.g., user 142 of quality system 134) to access business object 104. The quality system 134 may have instructions that the user (e.g., user 142 of quality system 134) may need to follow. Further, the quality system 134 may have some functions with testing/quality analysis based on transforming process information. When the process (e.g., business process 100) is associated to a physical resource (e.g., data resource 124)—such resource may be modelled by XSD schema (e.g., XSD 114, XML schema 112 created using XSD 114) and has somewhere its instances. The relations in XSD 114 model of such resource may allow a user (e.g., user 142 of quality system 134) to create and/or build own models on user-side schema map of physical resources using XML schema 112 that can be controlled and analyzed by the quality system 134.

For example, suppose a user 1 in table (e.g., tables 129)—'Warehouse 1' column adds an object 'Project'. The quality system 134 may analyze if there is active relation between every Warehouse_1 and Project. When user 1 in column 'Warehouse_1' adds a business object 104 'Fork-Lift', the quality system 134 may analyze if there is active relations between every 'Warehouse_1 and ForkLift', etc. The derivation methods of the quality system 134 may allow the quality system 134 to improve ordering/controlling of such resources.

The processor 136 may be a logic circuitry that responds to and processes the basic set of instructions 140 that drives the quality system 134. The processor 136 may include a microprocessor, a microcontroller, an embedded processor, a digital signal processor, and/or a graphics processor. The processor 136 may include supporting circuitry such as network controller, disk controller, RAM/cache controller, I/O controller (e.g., input/output controller 206), display controller, communication controller, etc.

The memory 138 may be any physical device used for storing information temporarily and/or permanently for immediate use by the processor 136 of the quality system 134, according to one embodiment.

In an example embodiment, the memory 138 may be a volatile memory that stores information on an integrated circuit used by the operating system, software, and hardware of the quality system 134, according to one embodiment.

The set of instructions 140 may be a group of commands for the processor 136 of the quality system 134 to perform in different situations. The set of instructions 140 may consist of addressing modes, instructions, native data types, registers, memory architecture, interrupt, and exception handling, and external I/O.

The user 142 may be a user of the quality system 134. The user 142 may access and/or control the processor 136, the memory 138 and/or the set of instructions 140 of the quality system 134 to plan/model/control/monitor a business process 100 and/or an industrial automation process 200 by setting up an XML object 120 to model a business object 104 and/or an industrial automation object 202 and a data resource 124 to model a business resource 108 and/or an industrial automation resource 204, based on BPMN 102. The user 142 may be a CEO, a Vice President, a department head, an officer, a manager, a staff, an overseer of a business process 100/industrial automation process 200, and/or a planner of a business process 100/industrial automation process 200, etc.

Figure 2:
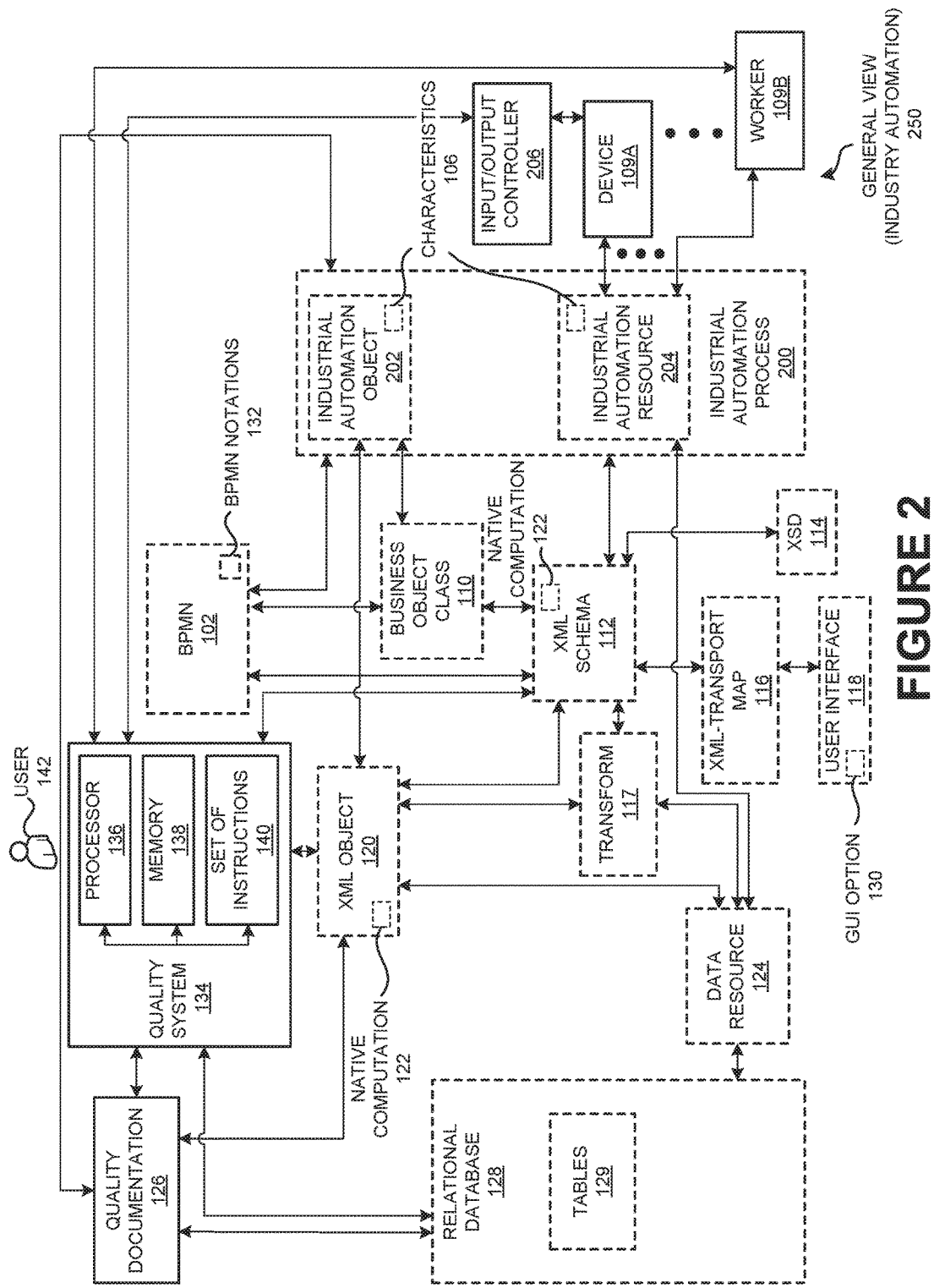
FIG. 2 is a general view of an industrial automation process modeled with BPMN by creating an XML object from an XML schema of FIG. 1 to model an industrial automation object and the data resource to model an industrial automation resource, according to one embodiment.

FIG. 2 is a general view 250 of an industrial automation process 200 modeled with BPMN 102 by creating an XML object 120 from an XML schema 112 of FIG. 1 to model an industrial automation object 202 and a data resource 124 to model an industrial automation resource 204, according to one embodiment.

Particularly, FIG. 2 builds on FIG. 1, and further adds, industrial automation process 200, industrial automation object 202, industrial automation resource 204 and input/output controller 206, according to one embodiment.

The industrial automation process 200 may be a process of using control systems, e.g., computers and/or robots, and/or information technologies for handling and/or controlling different processes and machineries in an industry to replace a human being. While the initial investment may be high, industrial automation process 200 may have the advantages of increased productivity, reduced cost associated with human operators (e.g., wages and benefits), increased quality and flexibility in a manufacturing process. Even if a company may hire 3 shifts of workers to run a manufacturing plant for 24 hours in a day, the plant may still need to be closed for maintenance and holidays. With industrial automation (e.g., industrial automation process 200), a company may run a manufacturing plant for 24 hours in a day, 7 days in a week and 365 days in a year leading to significantly increased productivity. Automation (e.g., industrial automation process 200) may alleviate the errors associated with human being. Unlike human beings, robots used in industrial automation process 200 may not involve fatigue, which may result in products with uniform quality manufactured at different times. With a human operator, adding a new task in the assembly line may require training. Yet robots may be programmed or re-programmed to do any task leading to significantly increased flexibility. Automated data collection in industrial automation process 200 may allow managers to collect key production information, improve data accuracy, and reduce data collection costs. Such accurate data allows managers to make timely decisions, reducing waste and improving decision process. Industrial automation (e.g., industrial automation process 200) may make the production line safe for the employees by deploying robots to handle hazardous conditions.

Examples of industrial automation process 200 may include automation of production line, automated data collection, automated assembly line, implementation of supervisory controls, predictive, proactive and remote maintenance management, instrumentation including communication protocols and networking, analytics based on historian implementation visualization through intelligent and end-user friendly HMI, GUI etc., real-time embedded and application software design and development for products, product testing, prototyping, customizing and product support. The industrial automation process 200 may increase quality and flexibility of operation in manufacturing process. Further, industrial automation process 200 may reduce error rate and increase efficiency of the industries implementing it. The industrial automation process 200 may be modeled with BPMN 102 by creating an XML object 120 from an XML schema 112.

The industrial automation object 202 may be a task, a sub-task, a system, a sub-system, an assembly line, a production line, an attachment, a robot, a vehicle, a belt conveyer system, a machine, an equipment, a device, an instrument, a training, and/or an operator, etc. The industrial automation object 202 may be modeled with a variable, a data structure, and/or a function for the industrial automation process 200. The industrial automation object 202 may be programmed to trigger relational database 128 based on XML schema 112 transformation to let automated functions be executed instantly. Examples of industrial automation object 202 may include control systems, system performance monitoring tools, plant startup or shutdown mechanism, job and equipment scheduling software etc. The industrial automation object 202 may be modeled based on the XML object 120.

The industrial automation resource 204 may be a worker, a robot, a vehicle, a conveyer belt, a machine, an equipment, a device, an instrument, a tool, raw material, fuel, energy source, supporting systems (e.g., air conditioning, heating, cooling, temperature/heat control, annealing, pressure control, lighting control, gas control, liquid control, material handling, material lifting/transporting/loading/replenishing, bulk material handling, cleaning, waste handling, computer, network, displays, sensors), a training handbook, a manual, and/or an operator. The industrial automation resource 204 may be an automated component of information technology infrastructure that represents all the data available to an industry that help in managing the functionality of an application (e.g., industrial automation object 202) programmatically. Industrial automation resource 204 may be modeled by data resource 124 associated with the XML object 120.

The input/output controller 206 may be a device that interfaces between the quality system 134 and the device 109A. Instead of just monitoring the status of the device 109A, the input/output controller 206 enables the quality system 134 to control the device 109A to perform industrial automation tasks in industrial automation process 200 (e.g., turn on/off, start/pause/stop, change speed, change state, change location, change orientation, change task, open/close, feed, fetch, move, rotate, remove, process, etc.) The input/output controller 206 may be an internal add-on that can either be used as a replacement and/or to allow for additional input or output devices for the quality system 134. The input/output controller 206 may be used for input and output of the quality system 134.

The industrial automation process 200 may be modeled with BPMN 102 by creating the XML object 120 from XML schema 112 of FIG. 1. The industrial automation object 202 may be associated with natively computed XML schema 112 and the data resource 124 to model an industrial automation resource 204.

Figure 3:
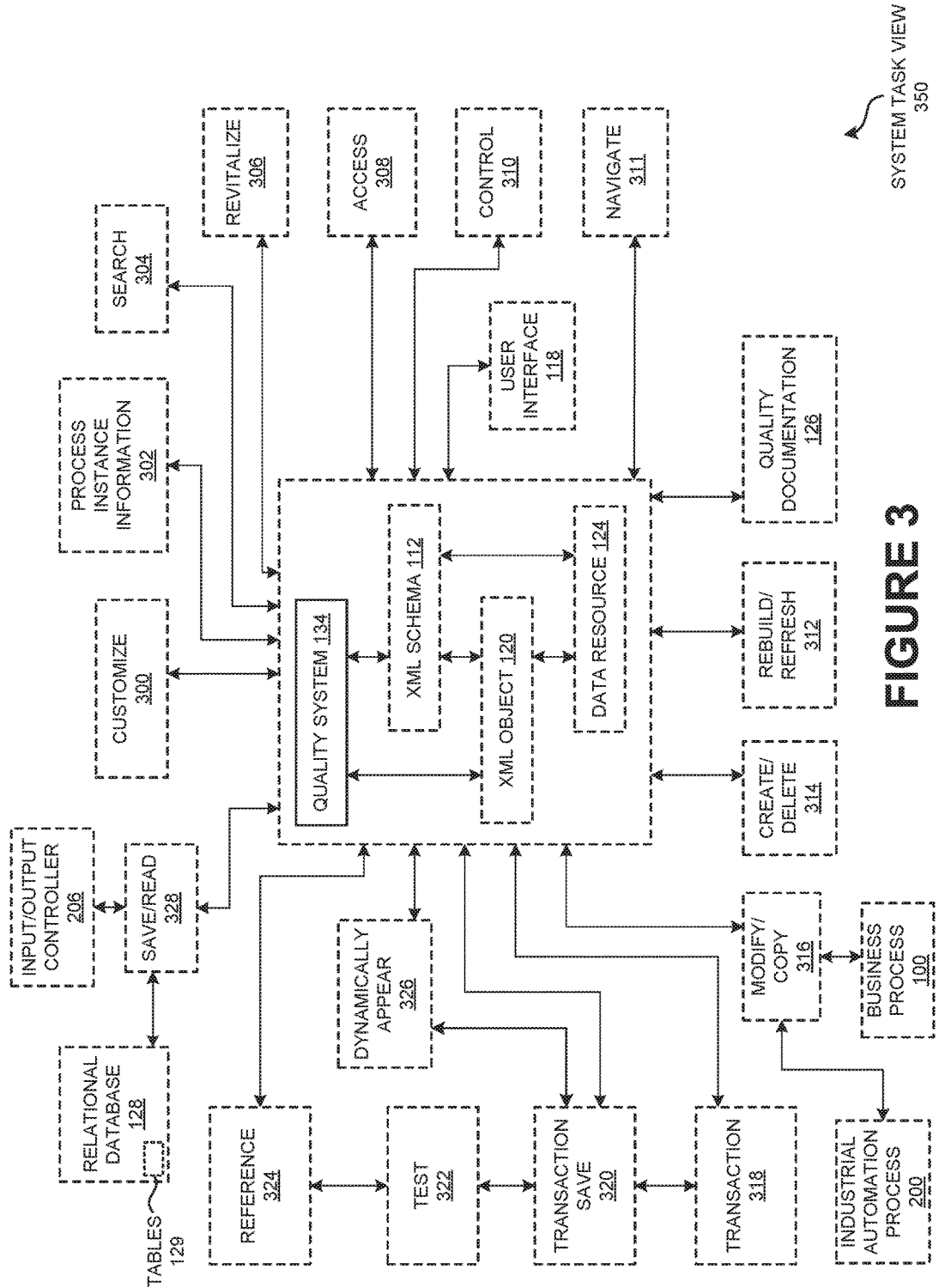
FIG. 3 is a system task view illustrating some possible operations in/on/by the XML object of FIG. 1, according to one embodiment.

FIG. 3 is a system task view 350 illustrating some possible operations in/on/by the XML object 120 of FIG. 1, according to one embodiment. Particularly, FIG. 3 builds on FIGS. 1 and 2, and further adds, a customize 300, a process instance information 302, a search 304, a revitalize 306, an access 308, a control 310, a navigate 311, a rebuild/refresh 312, a create/delete 314, a modify/copy 316, a transaction 318, a transaction save 320, a test 322, a reference 324, a dynamically appear 326, a save/read 328, and an input/output controller 206.

The customize 300 may be an operation of customization performed on an XML schema 112, an XML object 120 and/or a data resource 124 by the quality system 134. The customize 300 may be part of a process of creating, initializing, customizing, and/or manipulating the XML schema 112 based on the business process 100, the business object class 110, the XSD 114, and/or the BPMN 102. The customize 300 may be any of the process of creating, initializing, initiating, and/or manipulating the XML object 120 and/or the data resource 124 associated with the XML schema 112 according to the characteristics 106 of the business object 104 and/or the business resource 108. The customize 300 may use the transform 117, the XML-transport map 116 and/or the user interface 118. The customize 300 may be executed using native computation 122.

The process instance information 302 may be the data about the specific occurrence and/or execution of a business process 100. The process instance information 302 may provide data of one specific instance of a business process 100 that is currently executing and/or pending. Whenever a business process 100 is started, a process instance may be created that represents that specific instance was started. The process instance information 302 may contain all runtime information related to that instance.

The search 304 may be a process of electronically retrieving data, database records (e.g., tables 129), and/or other information from a database (e.g., relational database 128 of the quality system 134) and the data resource 124 of one or more XML objects 120. The search 304 may allow retrieving of data based on an Access Control List (ACL) object read in the BPMN 102 available to the users (e.g., user of quality system 134). The search 304 may allow searching of data related to one or more of the XML schema 112, the XML object 120, and/or the data resource 124.

The quality system 134 may create user interface (e.g., user interface 702) for user where the user may input all possible search parameters (e.g., using search 304) that could be done on a particular object (e.g., XML object 120 and business object 104). All possibilities may be calculated by relations (e.g., using relational database 128) by the quality system 134. The search may be done based on what the user expected in relation to a particular business object 104. The quality system 134 may analyze the search strategy for minimal amount of data to calculate index. The quality system 134 may look for all related business objects 104. After that, the quality system 134 has the full list of objects indexes to retrieve, and the search engine may collect all data from all needed data resources (e.g., data resource 124) by using XML-transport map 116. The search engine may have data of the objects which may be fragmented and split into small pieces. The XML-transport map 116 may be applied. A 'view' function may be used to organize and combine the objects and show them through a user interface 702 and/or export them to json format or API.

The revitalize 306 may be the process of updating, recovering and/or regenerating the XML schema 112, the XML object 120 and/or the associated data resource 124 by the quality system 134.

The access 308 may be the process of being able to retrieve, read, write, modify and/or use a particular data of the quality system 134. The access 308 may allow the import of XML schema 112 to convert and link it to a new table (e.g., new tables 406). Further, the access 308 may allow exporting the data from the linked table (e.g., tables 129) to an XML data file and/or an XML schema file. The XML-transport map 116 may be used.

The control 310 may be the process of verifying, adjusting directly and/or indirectly, guiding, shaping, and making sure that everything occurs according to the plans adopted, instructions issued and principles established by the quality system 134. The control 310 may allow regulation and/or supervision of the XML object 120 and the associated data resource 124.

The navigate 311 of the quality system 134 may create systematic navigation menu to enable the user to browse through, choose and access a number of business object 104 in the business process 100 modeled based on BPMN 102.

The user of the quality system 134 may navigate 311 through a number of business object(s) 102 through the user interface 702.

The rebuild/refresh 312 of the quality system 134 may enable renewal and/or remodeling of the business process 100 whenever any modification is made to the quality system 134 based on the XML schema 112. One example is adding, copying, cloning, pasting, deleting, modifying/updating an XML schema 112, an XML object 120 (e.g., new business object 400, new industrial automation object 500) and/or a data resource 124 of the quality system 134.

The create/delete 314 of the quality system 134 may allow creation, and/or deletion (and/or overwrite) of new XML objects (e.g., a second XML object 402), parse the object map to the user interface and generate new object transaction data. XML Schema Definition (XSD 114) may be used to create/delete 314 XML Schema.

The modify/copy 316 may be the process of modifying, altering, copying, cloning, and/or replicating the XML schema 112, the XML object 120 and/or the data resource 124 by the quality system 134. The quality system 134 may modify/copy 316 the XML object 120 and the associated data resource 124 when the business process 100 has a new or modified business object (e.g., new business object 400) and/or a new or modified business resource (e.g., second data resource 404).

The transaction 318 may be a sequence of information exchange and related work (e.g., database updating) that is treated as a unit for the purposes of satisfying a request and for ensuring database integrity. The transaction 318 may be an event and/or process (e.g., an input message, business process 100) initiated and/or invoked by a user (e.g., user of the quality system 134) and/or computer program, regarded as a single unit of work and requiring a record to be generated for processing in a database (e.g., relational database 128). The quality system 134 may prepare a transaction 318 for the XML object 120 by saving the XML object 120 and utilizing a transaction-save-function to evaluate an identification data of the XML object 120 to determine that the XML object 120 is referenced properly after saving whenever a new object (e.g., new business object 400, new industrial automation object 500) is added to the quality system 134.

The transaction save 320 may be the process of saving information related to a transaction, which may include creating new, modifying existing and/or deletion of existing XML schema(s) 112, XML object(s) 120 and/or data resource(s) 124. The transaction save 320 may involve checking of the relational database 128 for confirming the parent-object is available. Whenever a new business object 400 is added to the quality system 134 and/or whenever an existing business object is modified and/or deleted, all schema (e.g., XML schema 112) may have the dependency structure updated/recalculated and/or application codes of objects (e.g., XML object 120) may be rebuilt/refreshed 312. All of these steps may be completed before the transaction 318 may be successful and/or the relational database 128 may actually be changed to reflect a new business object 400.

The test 322 may be the evaluation, observation, and/or trial use to determine and/or document the capabilities, characteristics, effectiveness, reliability, and/or suitability of the new business object 400 when a new business object 400 is added to the quality system 134.

The reference 324 may be the means of uniquely identifying and locating a business object 104, a business resource 108, a business process 100, an XML schema 112, an XML object 120, and/or a data resource 124. The reference 324 to an item within an object table (e.g., relational database 128) may be obtained by using a reference pointer.

The dynamically appear 326 may be a feature that may allow the quality system 134 to display dynamically items related to XML schema 112, XML objects 120, and/or data resource 124, as well as items related to any system tasks. The dynamically appear 326 may be applied to the user interface 118 and/or the GUI option 130.

The save/read 328 may be a process of saving and/or reading an XML schema 112, an XML object, and/or a data resource 124. The save/read 328 may be part of copying data to the relational database 128 whenever a new XML schema 112, a new XML object 120 and/or a new data resource 124 is introduced to the quality system 134. The save/read 328 may also be used when an existing XML schema 112, an existing XML object 120 and/or an existing data resource 124 is modified based on the XML schema 112 dependency calculations and application codes to the XML object 120.

Figure 4:
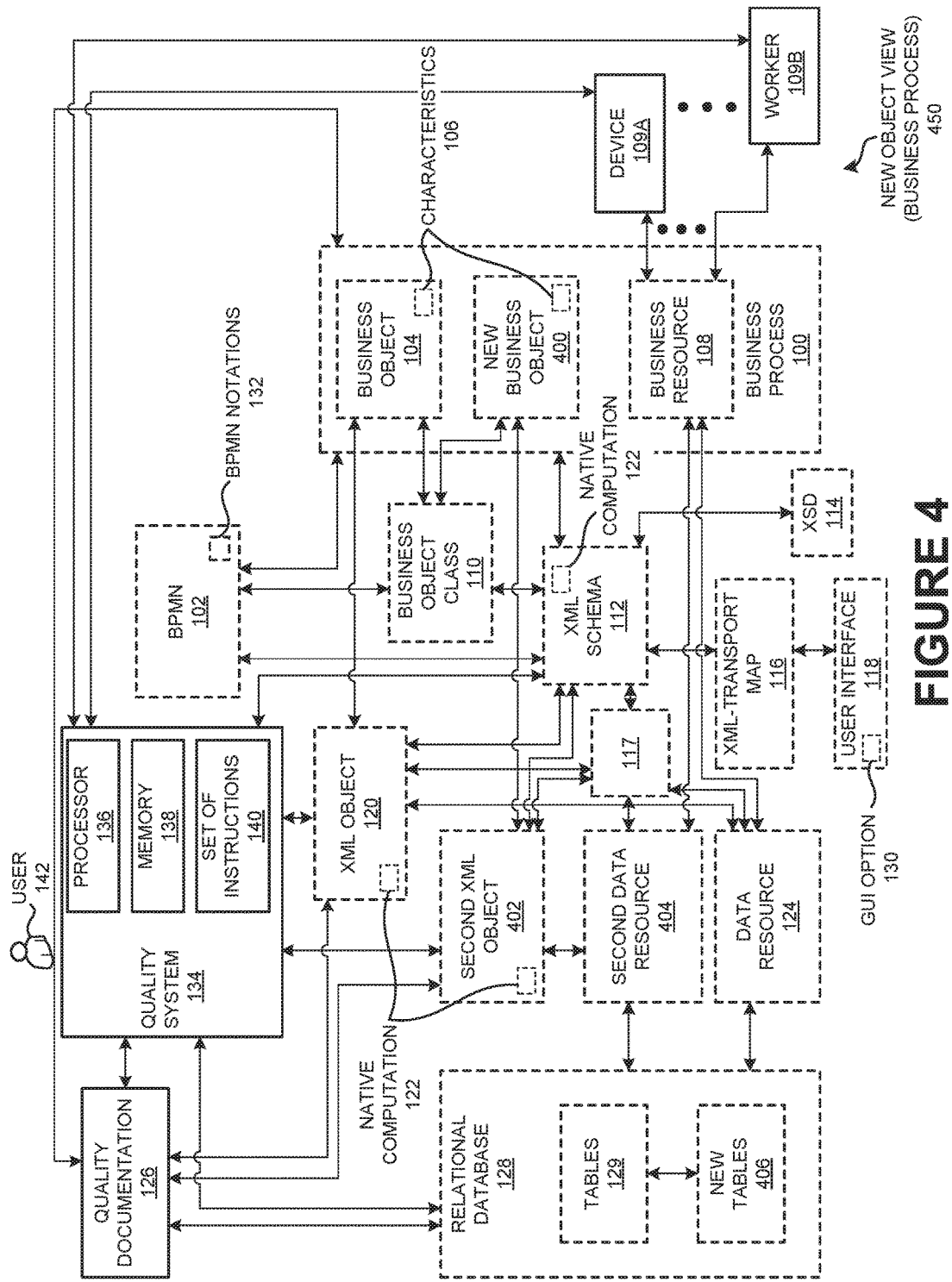
FIG. 4 is a new object view of a business process illustrating the modeling of a new business object by creating a second XML object with associated second data resource based on the XML schema and/or the data resource of FIG. 1, according to one embodiment.

FIG. 4 is a new object view 450 of a business process 100 illustrating the modeling of a new business object 400 by creating a second XML object 402 with associated second data resource 404 based on the XML schema 112, the XML object 120 and/or the data resource 124 of FIG. 1, according to one embodiment. Particularly, FIG. 4 builds on FIGS. 1, 2, and 3, and further adds, a new business object 400, a second XML object 402, a second data resource 404, and a new tables 406.

The new business object 400 may be an introduction and/or addition of another business object 104 to the quality system 134. A change in business process 100 may be resulted from the introduction of a new business object 400. The new business object 400 may be modeled by creating a second XML object 120 with associated second data resource 404 based on the XML schema 112, the XML object 120 and/or the data resource 124. The new business object 400 may be similar to the business object 104 such that the second XML object 402 and the second data resource 404 may be copied/cloned from the XML object 120 and data resource 124. Examples of new business object 400 may be a new worker, introduction of a new machinery, a new skill developed/trained worker, introduction of a more efficient method in production line assembly, etc.

The second XML object 402 may be another XML object defined in the eXtensible Markup Language (XML) to model the new business object 400. The second XML object 402 may be designed to store and/or transport data associated with the second XML object 402. The second XML object 402 may be created based on the XML schema 112. It may be created when the business process 100 is changed with a new business object 400. The second XML object 402 may be computed using native computation 122.

In fast modeling of business process 100, the second XML object 402 may be a copied/cloned version of the XML object 120 and/or other XML objects, with parameters optionally changed/updated. Similarly, the second data resource 404 may be copied/cloned from the data resource 124 and/or other data resources, and then updated/modified. The second XML object 402 may be associated with second data resource 404. The second XML object 402 with the second data resource 404 may be referenced to the XML object 120 with the data resource 124, and/or vice versa.

The second data resource 404 may be the additional and/or another data-related resources (e.g., storage, RAM, application, software, hardware, hard disk, bandwidth, network resources, computing resources, etc.) of the quality system 134 used by the second XML object 120. The data structure of the second data resource 404 maybe similar to that of the data resource 124.

The new tables 406 may be the advanced organized information in rows and columns format in the relational database 128 formed when the business process 100 has a new business object 400. The set of instructions 140 of the quality system 134 may add/update the data structure of the relational database 128 with the new tables 406 and a new column and/or a new row to allow association to processes. The new tables 406 may capture the relationship of the second XML object and the second data resource 404 with existing XML objects (e.g., the XML object 120) and existing data resources (e.g., the data resource 124).

Figure 5:
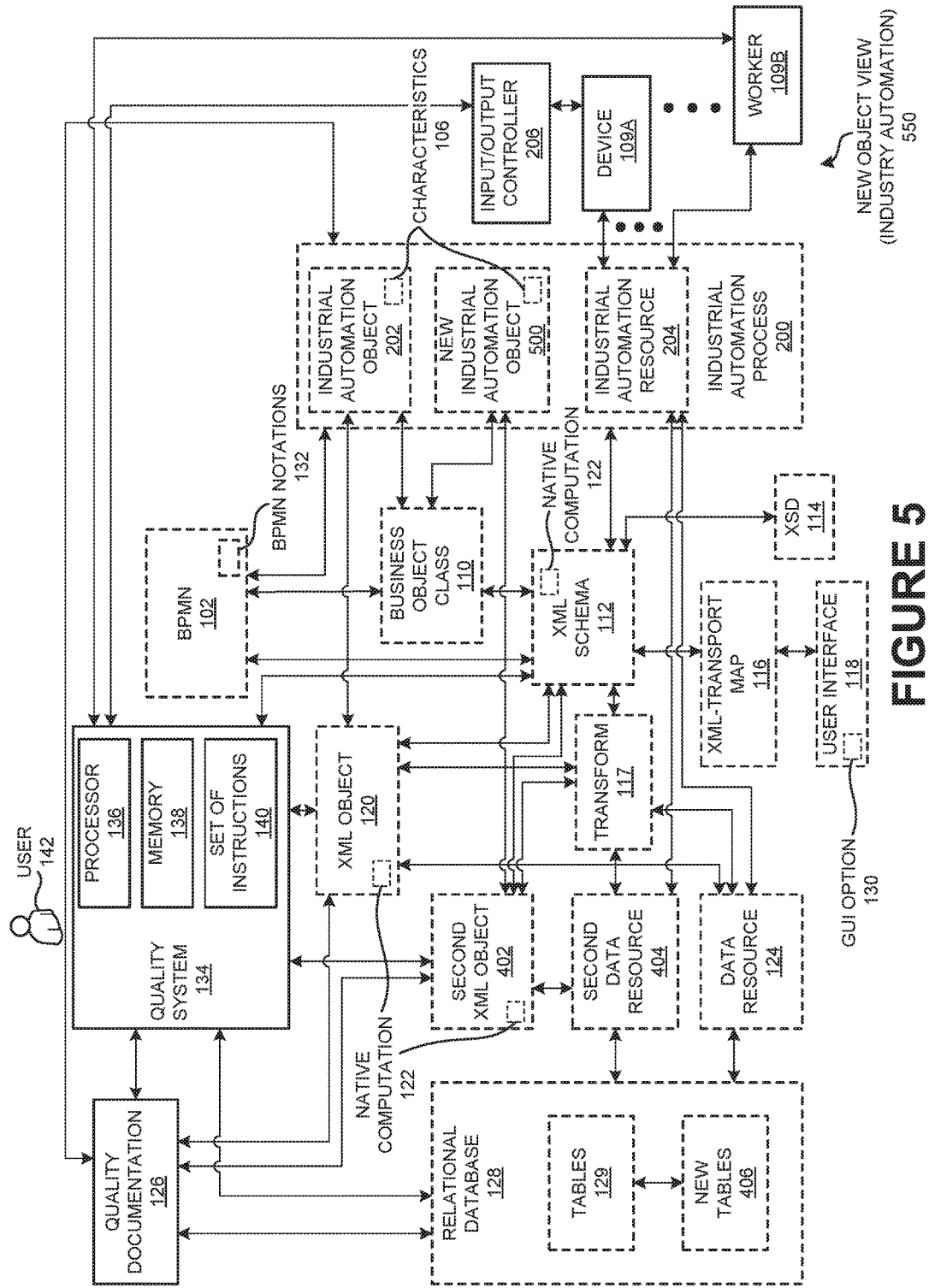
FIG. 5 is a new object view of an industrial automation process illustrating the modeling of a new industrial automation object by creating a second XML object with associated second data resource based on the XML schema and/or the data resource of FIG. 2, according to one embodiment.

FIG. 5 is a new object view 550 of an industrial automation process 200 illustrating the modeling of a new industrial automation object 500 by creating a second XML object 402 with associated second data resource 404 based on the XML schema 112, the XML object 120, and/or the data resource 124 of FIG. 2, according to one embodiment. Particularly, FIG. 5 builds on FIG. 1 through 4, and further adds a new industrial automation object 500.

The new industrial automation object 500 may be a freshly introduced task, sub-task, system, sub-system, assembly line, production line, attachment, robot, vehicle, belt conveyer system, machine, equipment, device, instrument, training, operator, and/or function of the industrial automation process 200. The new industrial automation object 500 may be modeled by the quality system 134 by creating a second XML object 402 with associated second data resource 404 based on the XML schema 112 and/or the data resource 124.

Examples of new industrial automation object 500 may include introduction of new and/or modified control systems, addition/upgrading of system performance monitoring tools, an improved plant startup or shutdown mechanism, an advanced job and equipment scheduling software etc. The new industrial automation object 500 and its characteristics 106 may be modeled by the second XML object 402 and the second data resource 404 based on the same XML schema 112 from which the XML object 120 and the data resource 124 were created. The new industrial automation object 500 may be similar to the industrial automation object 202 such that the second XML object 402 and the second data resource 404 may be copied/cloned from the XML object 120 and the data resource 124.

In fast modeling of industrial automation process 200, the second XML object 402 may be a copied/cloned version of the XML object 120 and/or other XML objects, with parameters optionally changed/updated. Similarly, the second data resource 404 may be copied/cloned from the data resource 124 and/or other data resources, and then updated/modified. The second XML object 402 may be associated with second data resource 404. The second XML object 402 with the second data resource 404 may be referenced to the XML object 120 with the data resource 124, and/or vice versa.

Figure 6:
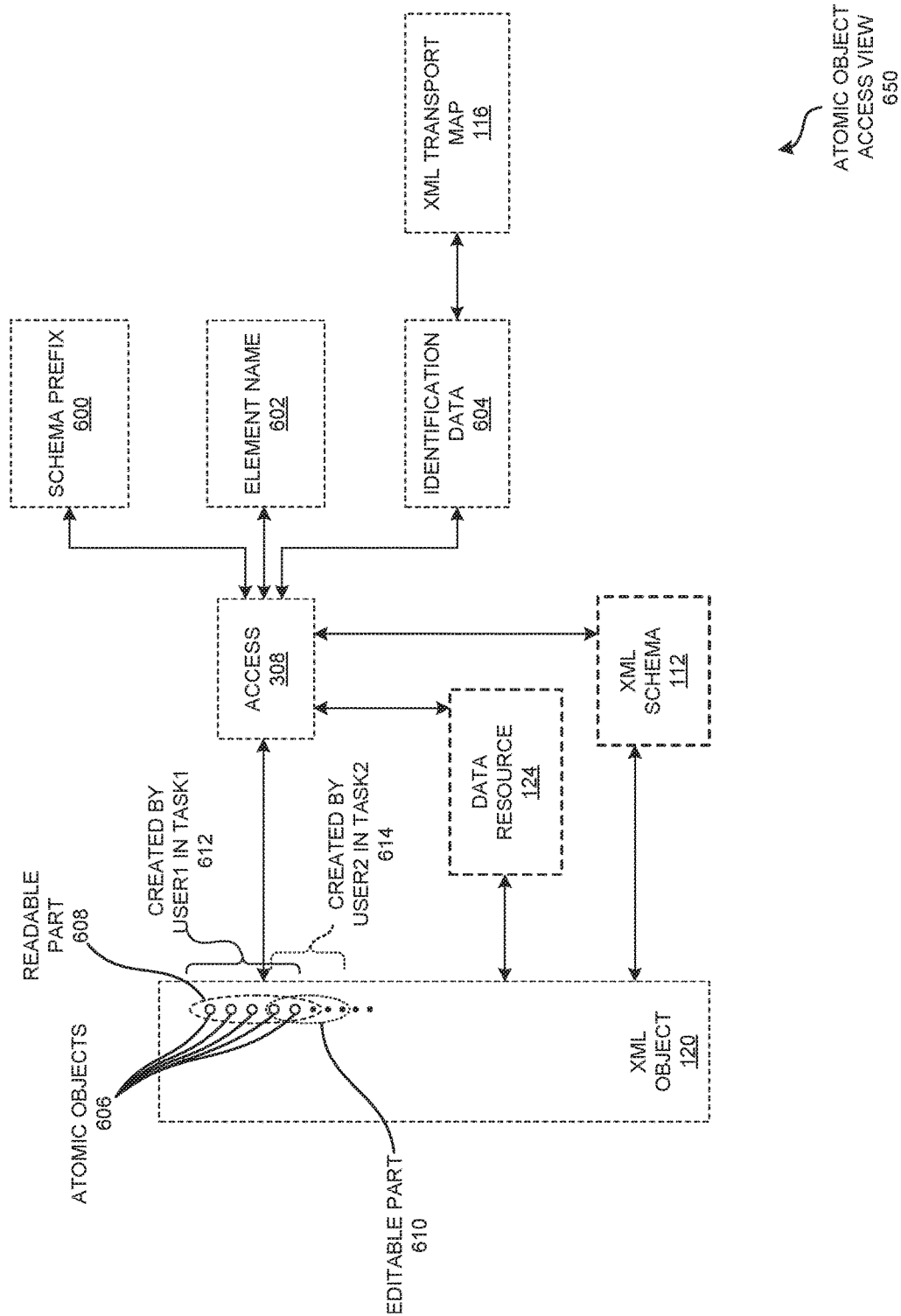
FIG. 6 is an atomic object access view illustrating the access, readability, editability and creator of atomic objects of the XML objects of FIG. 1, according to one embodiment.

FIG. 6 is an atomic object access view 650 illustrating the access 308, readability, editability and creation of atomic objects 606 of the XML objects 120 of FIG. 1, according to one embodiment. Particularly, FIG. 6 builds on FIG. 1 through 5, and further adds, a schema prefix 600, an element name 602, an identification data 604, an atomic object 606, a readable part 608, an editable part 610, a "created by user—task 1" 612, and a "created by user—task 2" 614.

The schema prefix 600 may be the name and/or identity (ID) of an XML schema 112 or an XML object 120 to be used as a prefix during access 308 to individual atomic objects 606 of the XML object 120 and/or XML schema 112.

The schema prefix 600 may be an affix (e.g., a word, letter, or a number) placed before the name of an object (e.g., XML schema 112, and/or XML object 120) when accessing elements of the object. Each of the XML schema 112 and/or XML object 120 may have a schema prefix 600 to enable identifying a particular XML schema 112 and/or a particular XML object 120.

The element name 602 may be a tag, an identity, and/or a title given to the fundamental/basic units of the XML schema 112 and/or the XML object 120.

The identification data 604 may be data to establish identity (e.g. element name 602, pointers, internal representation in a computer, internal identification) of elements of XML schema 112 and/or XML object 120 to be accessed. The identification data 604 may or may not be readable to human. The identification data 604 may be linked and/or communicated from/to the XML-transport map 116.

The atomic object(s) 606 may be fundamental/basic accessible elements in an XML schema 112 and/or an XML object 120. The atomic object 606 may or may not contain references to other XML schema and/or other XML object. The atomic object 606 may be accessed by a name with a schema prefix 600 and an element name 602. A user 142 may have different access rights to different atomic object(s) 606. In the example embodiment in FIG. 6, some atomic objects 606 (e.g. those in editable part 610) may be created by the user 142 in task 2 and thus is editable in task 2, but may only be readable in task 1 by the same user. In another example, some atomic objects 606 (e.g. those in editable part 610) may be created by one user (in task 2) and thus is editable by the user, but may only be readable by another user (in task 1).

The readable part 608 may be a collection of atomic objects 606 each of which may be readable using an access name with a schema prefix 600 and an element name 602. An atomic object 606 in the readable part 608 may or may not be editable. The readable part may include high priority parameters that can be read by many users but can only be edited by some system administrator.

The editable part 610 may be a collection of atomic objects 606 each of which may be editable/changeable/modifiable using an access name with a schema prefix 600 and an element name 602. An atomic object 606 in the editable part 610 may or may not be readable.

In one example embodiment, a user may perform two tasks: task 1 and task 2. The user may create some atomic objects in task 1 (as marked by "created by user task 1" 612). The user may create some atomic objects in task 2. Within task 2, the atomic objects 606 created in task 1 may be readable while the atomic objects 606 created in task 2 may be editable.

The quality system 134 may give full access 308 of a group of atomic objects 606 to a user (e.g. CEO of a company) through the user interface 702 to change (e.g., read, write, create) the atomic object 606. The quality system 134 may give limited access 308 of another group of atomic objects to another user (e.g. an assembly line operator) to perform at least one of read, write, modify, create, delete, call, execute.

Figure 7:
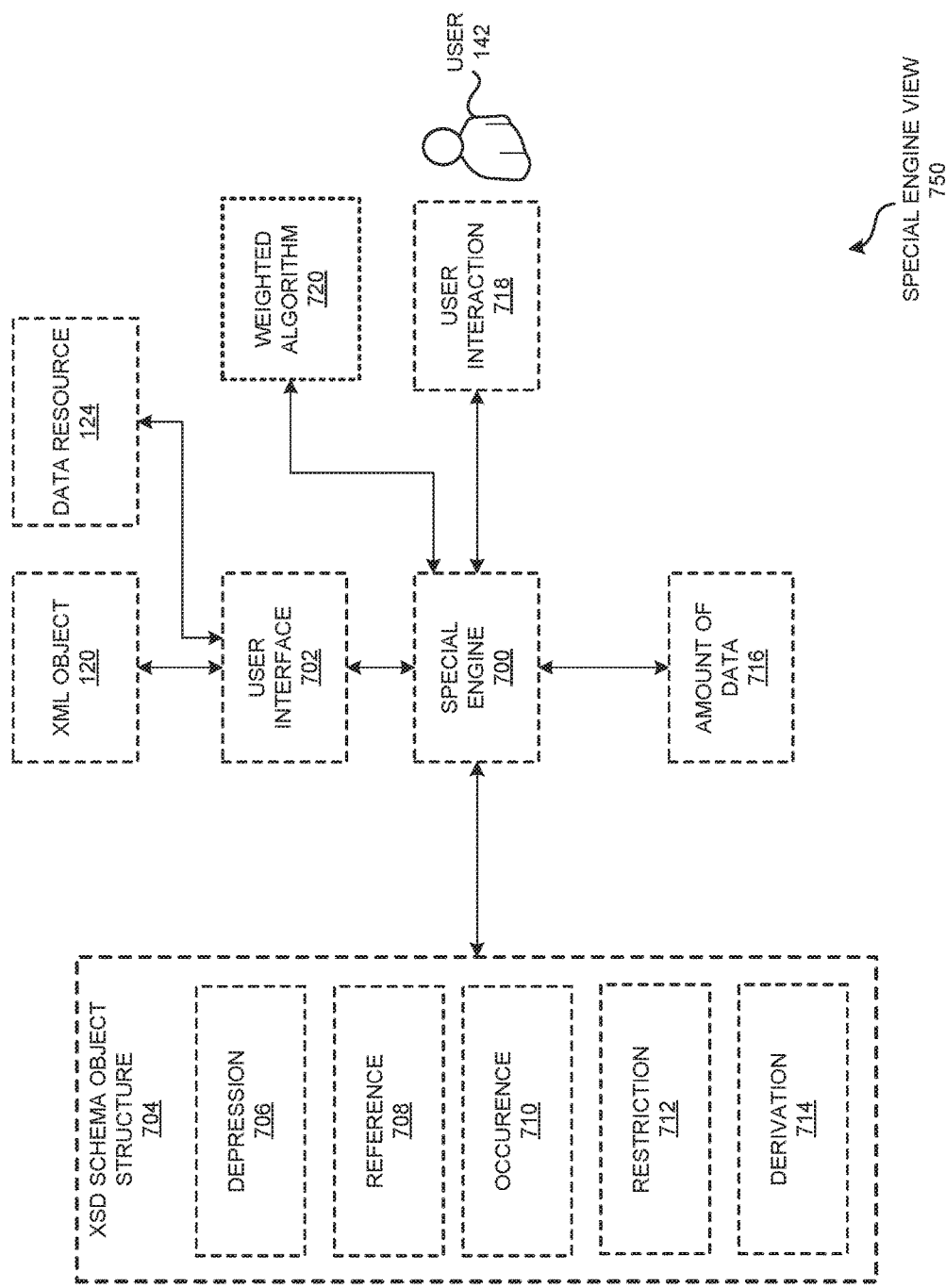
FIG. 7 is a special engine view illustrating the generation of a special engine associated with the XML object and the data resource of FIG. 1, according to one embodiment.

FIG. 7 is a special engine view 750 illustrating the generation of a special engine 700 based on an amount of data 716 and user interaction 718 associated with an XML object 120 and data resource 124 based on XSD schema object structure 704 of FIG. 1, according to one embodiment. Particularly, FIG. 7 builds on FIG. 1 through 6, and further adds, a special engine 700, a user interface 702, an XSD schema object structure 704, a depression 706, a reference 708, an occurrence 710, a restriction 712, a derivation 714, an amount of data 716, a user interaction 718, and a weighted algorithm 720.

The special engine 700 may be a computer program generated to perform a special function (e.g. core and/or essential function) associated with the XML object 120 and the data resource 124 based on a XSD schema object structure 704. One such function may be optimizing a user interface 702. The special engine 700 may be written in machine language, assembly language, C language, Python, PHP, Java, etc. The special engine may be able to execute in native mode. The role of the special engine 700 may be to provide services for transformations (e.g., using transform 117) associated with the XML object 120 and the data resource 124. It may also optimize the user interface 702.

The user interface 702 may include a set of commands, pictures, graphics, animation, video, sound clips, music, audio, icons, clickable icons, forms, menus, keyboard, mouse, mouse pad, touchable surface/screen, camera, motion and/or sensors, through which a user (e.g., user of quality system 134, worker 109B) communicates with a program (e.g., quality system 134) associated with the XML object 120 and the data resource 124.

The XSD schema object structure 704 may be the construction and/or arrangement of and relations between some elements (e.g., XML object 120) of XML schema 112 in the quality system 134. The XSD schema object structure 704 may combine the XML object 120 definition and structure into one element. The XSD schema object structure 704 may be an input or output of an activity or process. The XSD schema object structure 704, or a part of it, may be sent as a message. The XSD schema object structure 704 may simply be a data store and/or a data transport. The XSD schema object structure 704 may include depression 706, reference 708, occurrence 710, restriction 712, and derivation 714. The XSD schema and/or the XSD schema object structure 704 may be used in a transformation (e.g., transform 117). The XSD schema and/or the XSD schema object structure 704 may be transformed (e.g., using transform 117) to the special engine 700 and/or other code(s) (e.g., sets of instructions, software, software module, applications) that can be executed to perform useful functions (e.g., on XML schema 112, on XML object 120, on data resource 124).

The depression 706 may include a redefinition (e.g. using redefine clause similar to include clause). A redefined external schema file may have the same target namespace definition as the including file, and/or no target namespace definition at all. Redefinition may allow modification of the included definitions. Simple types may be restricted. Complex types may be extended and/or restricted. The depression 706 may allow to upgrade system code models by creating new type objects. This may allow the special engine 700 to understand new objects and/or reallocate old data types. This may save time that would otherwise be spent on codes and/or functions which handle old/new objects.

The reference 708 may describe the properties and/or methods of XSD schema object structure 704. The reference 708 of XSD schema object structure 704 may define/direct the special engine 700 to refer a particular source element (e.g., XML object 120) in some optimization (e.g. optimization of the user interface 702, optimization of the XML object(s) 120, optimization of XML schema(s) 112, optimization of data resource(s) 124, etc.). The reference 708 may refer/link to XML schema(s) 112, XML object(s) 120, data resource(s) 124, XML-transport map(s) 116, and/or XSD schema object structure(s) 704.

The occurrence 710 may be a control indicator of the XSD schema object structure 704 used to define how often an element (e.g., XML object 120) can occur. The occurrence 710 may be used in/as class definitions. With occurrence 710, class definitions may be possible and available. The occurrence 710 may define the amount of elements that may be defined. If they are unbounded, there may be unlimited data elements available. The occurrence 710 may be used in add/read scenarios. The amount of occurrence 710 may be user-selectable and may be optimized.

The restriction 712 may be used to define, modify and/or update acceptable values for XML elements or attributes (e.g. in XML schema(s) 112, XML object(s) 120).

The derivation 714 may be in XML schema. The derivation 714 may be associated with class transformations. The derivation 714 may be and/or may include a schema (e.g. XML schema 112) to class transformation.

The amount of data 716 may be the minimum volume of data that needs to be moved and/or exchanged between different databases in order to generate an optimized user interface (e.g., user interface 702). From construction point of view, new components may need to be added over time. New components may need to be added to describe/augment/supplement the existing components. When new components are to be constructed, the amount of data 716 may be increased/decreased/changed. The new components maybe constructed using a user interface 118. The form generation may generate code for user interface 118 in JavaScript technology which may be played with the XML schema 112. The JavaScript UI (user interface) may transmit data to the special engine 700 that may parse the data in XML and save it to storage. The objects (e.g. XML object(s) 120) may have multi-deep traversal, recurring, and/or accessing to cross referenced relations (e.g. in relational database 128). Sense of association may be integrated from/to/in the BPMN 102 process choreography.

The user interaction 718 may be communication of a user with a particular element (e.g., XML object 120) of the XSD schema object structure 704.

The weighted algorithm 720 may be an algorithm that chooses the best element(s) (e.g., XML object 120) to remove in order to make space for new elements according to weightage given to each of its attributes. The special engine 700 may be generated based on an amount of data 716 and/or a number of user interactions 718 (e.g. via user interface 702, via user interface 118, via GUI option 130) as a result of the weighted algorithm 720 which considers each of these factors when generating the special engine 700. The special engine 700 may generate an optimized user interface.

For example, the weighted algorithm 720 may choose elements (e.g., XML object 120) based on time since last accessed. (e.g., to replace elements that has not been accessed in a while), number of times accessed (e.g., to replace elements which has not been accessed many times), number of elements which need to be removed in order to make space for the new element (e.g., to replace the least amount of elements).

Figure 8:
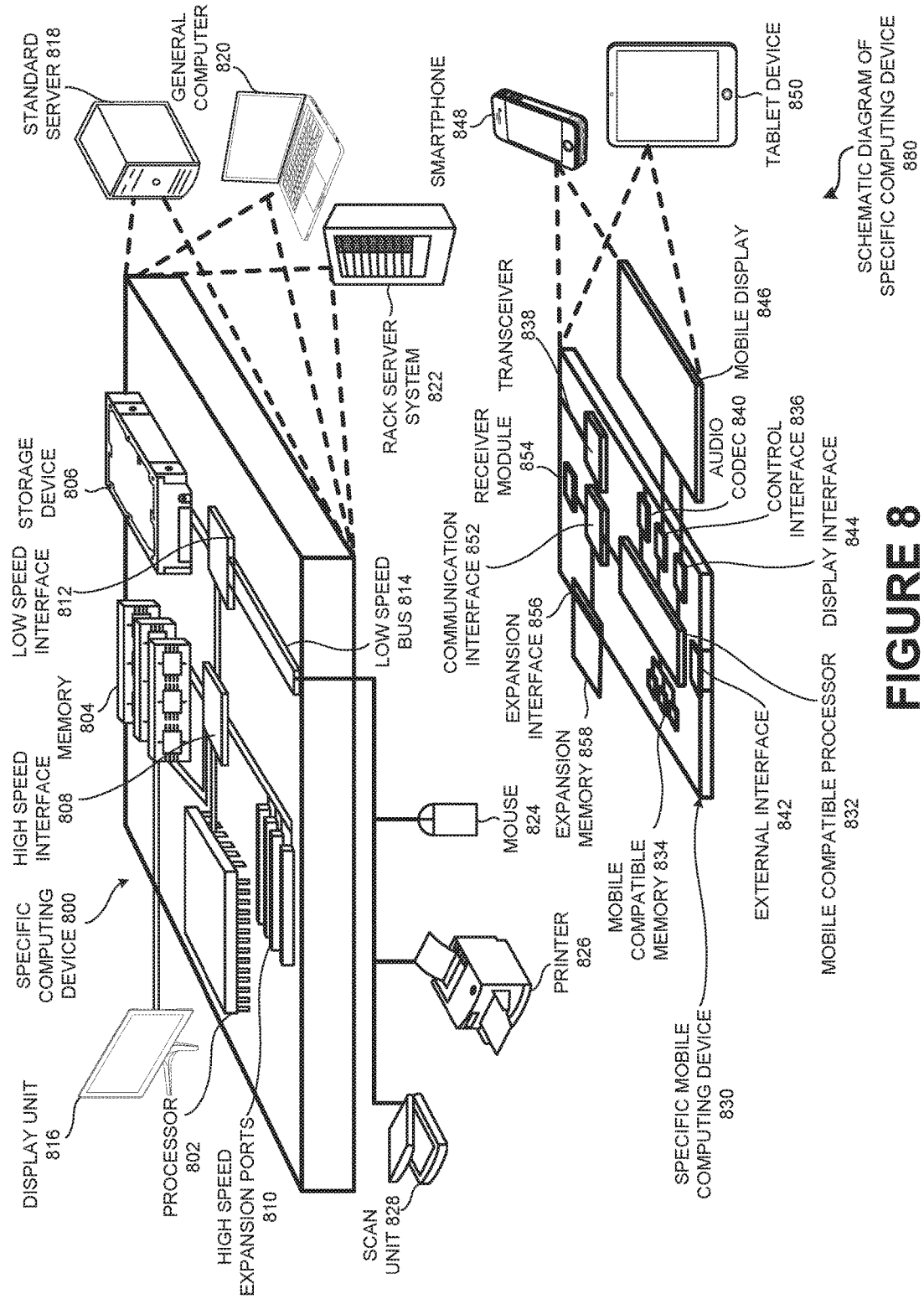
FIG. 8 is a schematic diagram of exemplary data processing devices that can be used to implement the methods and systems disclosed herein, according to one embodiment.

FIG. 8 is a schematic diagram of specific computing device 880 and a specific mobile computing device 830 that can be used to perform and/or implement any of the embodiments disclosed herein. In one or more embodiments, the quality system 134 and/or the device(s) 109A illustrated in FIG. 1 may be the specific computing device 800.

The specific computing device 800 may represent various forms of digital computers, such as laptops, desktops, workstations, personal digital assistants, servers, blade servers, mainframes, and/or other appropriate computers. The specific mobile computing device 830 may represent various forms of mobile devices, such as smartphones, camera phones, personal digital assistants, cellular telephones, and other similar mobile devices. The components shown here, their connections, couples, and relationships, and their functions, are meant to be exemplary only, and are not meant to limit the embodiments described and/or claimed, according to one embodiment.

The specific computing device 800 may include a processor 802, a memory 804, a storage device 806, a high speed interface 808 coupled to the memory 804 and a plurality of high speed expansion ports 810, and a low speed interface 812 coupled to a low speed bus 814 and a storage device 806. In one embodiment, each of the components heretofore may be inter-coupled using various buses, and may be mounted on a common motherboard and/or in other manners as appropriate. The processor 802 may process instructions for execution in the specific computing device 800, including instructions stored in the memory 804 and/or on the storage device 806 to display a graphical information for a GUI on an external input/output device, such as a display unit 816 coupled to the high speed interface 808, according to one embodiment.

In other embodiments, multiple processors and/or multiple buses may be used, as appropriate, along with multiple memories and/or types of memory. Also, a plurality of specific computing device 800 may be coupled with, with each device providing portions of the necessary operations (e.g., as a server bank, a group of blade servers, and/or a multi-processor system).

The memory 804 may be coupled to the specific computing device 800. In one embodiment, the memory 804 may be a volatile memory. In another embodiment, the memory 804 may be a non-volatile memory. The memory 804 may also be another form of computer-readable medium, such as a magnetic and/or an optical disk. The storage device 806 may be capable of providing mass storage for the specific computing device 800. In one embodiment, the storage device 806 may be includes a floppy disk device, a hard disk device, an optical disk device, a tape device, a flash memory and/or other similar solid state memory device. In another embodiment, the storage device 806 may be an array of the devices in a computer-readable medium previously mentioned heretofore, computer-readable medium, such as, and/or an array of devices, including devices in a storage area network and/or other configurations.

A computer program may be comprised of instructions that, when executed, perform one or more methods, such as those described above. The instructions may be stored in the memory 804, the storage device 806, a memory coupled to the processor 802, and/or a propagated signal.

The high speed interface 808 may manage bandwidth-intensive operations for the specific computing device 800, while the low speed interface 812 may manage lower bandwidth-intensive operations. Such allocation of functions is exemplary only. In one embodiment, the high speed interface 808 may be coupled to the memory 804, the display unit 816 (e.g., through a graphics processor and/or an accelerator), and to the plurality of high speed expansion ports 810, which may accept various expansion cards.

In the embodiment, the low speed interface 812 may be coupled to the storage device 806 and the low speed bus 814. The low speed bus 814 may be comprised of a wired and/or wireless communication port (e.g., a Universal Serial Bus ("USB"), a Bluetooth® port, an Ethernet port, and/or a wireless Ethernet port). The low speed bus 814 may also be coupled to the scan unit 828, a printer 826, a keyboard, a mouse 824, and a networking device (e.g., a switch and/or a router) through a network adapter.

The specific computing device 800 may be implemented in a number of different forms, as shown in the figure. In one embodiment, the specific computing device 800 may be implemented as a standard server 818 and/or a group of such servers. In another embodiment, the specific computing device 800 may be implemented as part of a rack server system 822. In yet another embodiment, the specific computing device 800 may be implemented as a general computer 820 such as a laptop or desktop computer. Alternatively, a component from the specific computing device 800 may be combined with another component in a specific mobile computing device 830. In one or more embodiments, an entire system may be made up of a plurality of specific computing device 800 and/or a plurality of specific computing device 800 coupled to a plurality of specific mobile computing device 830.

In one embodiment, the specific mobile computing device 830 may include a mobile compatible processor 832, a mobile compatible memory 834, and an input/output device such as a mobile display 846, a communication interface 852, and a transceiver 838, among other components. The specific mobile computing device 830 may also be provided with a storage device, such as a microdrive or other device, to provide additional storage. In one embodiment, the components indicated heretofore are inter-coupled using various buses, and several of the components may be mounted on a common motherboard.

The mobile compatible processor 832 may execute instructions in the specific mobile computing device 830, including instructions stored in the mobile compatible memory 834. The mobile compatible processor 832 may be implemented as a chipset of chips that include separate and multiple analog and digital processors. The mobile compatible processor 832 may provide, for example, for coordination of the other components of the specific mobile computing device 830, such as control of user interfaces, applications run by the specific mobile computing device 830, and wireless communication by the specific mobile computing device 830.

The mobile compatible processor 832 may communicate with a user through the control interface 836 and the display interface 844 coupled to a mobile display 846. In one embodiment, the mobile display 846 may be a Thin-Film-Transistor Liquid Crystal Display ("TFT LCD"), an Organic Light Emitting Diode ("OLED") display, and another appropriate display technology. The display interface 844 may comprise appropriate circuitry for driving the mobile display 846 to present graphical and other information to a user. The control interface 836 may receive commands from a user and convert them for submission to the mobile compatible processor 832.

In addition, an external interface 842 may be provide in communication with the mobile compatible processor 832, so as to enable near area communication of the specific mobile computing device 830 with other devices. External interface 842 may provide, for example, for wired communication in some embodiments, or for wireless communication in other embodiments, and multiple interfaces may also be used.

The mobile compatible memory 834 may be coupled to the specific mobile computing device 830. The mobile compatible memory 834 may be implemented as a volatile memory and a non-volatile memory. The expansion memory 858 may also be coupled to the specific mobile computing device 830 through the expansion interface 856, which may comprise, for example, a Single In Line Memory Module ("SIMM") card interface. The expansion memory 858 may provide extra storage space for the specific mobile computing device 830, or may also store an application or other information for the specific mobile computing device 830.

Specifically, the expansion memory 858 may comprise instructions to carry out the processes described above. The expansion memory 858 may also comprise secure information. For example, the expansion memory 858 may be provided as a security module for the specific mobile computing device 830, and may be programmed with instructions that permit secure use of the specific mobile computing device 830. In addition, a secure application may be provided on the SIMM card, along with additional information, such as placing identifying information on the SIMM card in a non-hackable manner.

The mobile compatible memory may include a volatile memory (e.g., a flash memory) and a non-volatile memory (e.g., a non-volatile random-access memory ("NVRAM")). In one embodiment, a computer program comprises a set of instructions that, when executed, perform one or more methods. The set of instructions may be stored on the mobile compatible memory 834, the expansion memory 858, a memory coupled to the mobile compatible processor 832, and a propagated signal that may be received, for example, over the transceiver 838 and/or the external interface 842.

The specific mobile computing device 830 may communicate wirelessly through the communication interface 852, which may be comprised of a digital signal processing circuitry. The communication interface 852 may provide for communications using various modes and/or protocols, such as, a Global System for Mobile Communications ("GSM") protocol, a Short Message Service ("SMS") protocol, an Enhanced Messaging System ("EMS") protocol, a Multimedia Messaging Service ("MMS") protocol, a Code Division Multiple Access ("CDMA") protocol, Time Division Multiple Access ("TDMA") protocol, a Personal Digital Cellular ("PDC") protocol, a Wideband Code Division Multiple Access ("WCDMA") protocol, a CDMA2000 protocol, and a General Packet Radio Service ("GPRS") protocol.

Such communication may occur, for example, through the transceiver 838 (e.g., radio-frequency transceiver). In addition, short-range communication may occur, such as using a Bluetooth®, Wi-Fi, and/or other such transceiver. In addition, a GPS ("Global Positioning System") receiver module 854 may provide additional navigation-related and location-related wireless data to the specific mobile computing device 830, which may be used as appropriate by a software application running on the specific mobile computing device 830.

The specific mobile computing device 830 may also communicate audibly using an audio codec 840, which may receive spoken information from a user and convert it to usable digital information. The audio codec 840 may likewise generate audible sound for a user, such as through a speaker (e.g., in a handset smartphone of the specific mobile computing device 830). Such a sound may comprise a sound from a voice telephone call, a recorded sound (e.g., a voice message, a music files, etc.) and may also include a sound generated by an application operating on the specific mobile computing device 830.

The specific mobile computing device 830 may be implemented in a number of different forms, as shown in the figure. In one embodiment, the specific mobile computing device 830 may be implemented as a smartphone 848. In another embodiment, the specific mobile computing device 830 may be implemented as a personal digital assistant ("PDA"). In yet another embodiment, the specific mobile computing device, 830 may be implemented as a tablet device 850.

I claim:

1. A method comprising:

generating a set of instructions to perform a core function associated with an eXtensible Markup Language (XML) object and a data resource to be used thereby based on transformation of an XML Schema Definition (XSD) schema object structure into the set of instructions, the set of instructions being written in at least one of: a machine language, an assembly language and a high-level language, and the XSD schema object structure comprising relations between XML objects of an XML schema in a quality system;

natively computing the XML schema and the XML object through executing the set of instructions through a processor of a quality system using a memory of the quality system communicatively coupled with the processor;

associating the natively computed XML schema and the XML object to an industrial automation object of an industrial automation process modeled based on a Business Process Model and Notation (BPMN) methodology;

generating an XML-transport map based on the natively computed XML schema, the XML-transport map listing every variable in the natively computed XML schema along with a memory address thereof;

dynamically creating a user interface for any object type through the XML-transport map;

associating the natively computed XML object with the data resource based on the natively computed XML schema;

customizing, through the created user interface, the natively computed XML object according to characteristics of the industrial automation object;

modeling a transaction of the industrial automation object with an XML transaction associated with the natively computed XML object;

preparing the XML transaction for the natively computed XML object by saving the natively computed XML object and utilizing a transaction-save-function to evaluate an identification data of the natively computed XML object to determine that the natively computed XML object is referenced properly after saving;

saving the natively computed XML object to a relational database of the quality system, where a number of tables is used for XSD elements comprising at least one of a complex type element, a sequence, a referenced element, a referenced attribute, and a simple type element, the natively computed XML object being an XSD element; and modifying the natively computed XML object and the associated data resource in response to a modification in the industrial automation process by way of a modification in the industrial automation object and an associated industrial automation resource in accordance with, even prior to the relational database being changed to reflect the modification in the industrial automation object:

automatically one of: updating and recalculating dependency structures defined in the natively computed XML schema; and automatically one of: rebuilding and refreshing an application code of the natively computed XML object.

2. The method of claim 1, further comprising:
enabling, through the XML-transport map, access to the natively computed XML object based on at least one of a schema prefix, an element name, and the identification data.

3. The method of claim 1, further comprising:
developing a number of custom notations based on the BPMN methodology;
associating the XSD elements to BPMN tasks using an XPath notation;
deciding which part of the natively computed XML object is to be readable;
deciding which part of the natively computed XML object is to be editable; and
determining which part of the natively computed XML object is to be created in which user-task.

4. The method of claim of claim 1, further comprising:
generating a special engine associated with the natively computed XML object and the associated data resource based on the XSD schema object structure comprising at least one of depressions, references, occurrences, restrictions, and derivations, the special engine comprising the set of instructions; and
generating the special engine also based on an amount of data and a number of user interactions as a result of a weighted algorithm.

5. The method of claim 1, further comprising at least one of:
providing the user interface based on association type features of the BPMN methodology;
permitting a user to create a new object of an object type that is referenceable to the natively computed XML object;
permitting the user to create another new object of an object type that is used by the natively computed XML object;
performing a search based on an Access Control List (ACL) object read in the BPMN methodology available to users, the search being a process of electronically retrieving at least one of: data, the number of tables and other information from the relational database of the quality system;
providing a dynamically changing Graphical User Interface (GUI) option to the user interface to adjust optional content when the natively computed XML object has XSD choice elements; and
making the natively computed XML object dynamically appear after filling parent-object before saving to the XML transaction when the natively computed XML object is recursive.

6. The method of claim 3, comprising the number of custom notations having associations to eXtensible Stylesheet Language (XSL) transformations which are considered like-in database triggers.

7. The method of claim 1:
wherein a schema element is identified by a unique element identifier, and
wherein an optional name transposing is performed with a schema prefix namespace to address a resource storing database, and the unique element identifier to address an atomic object.

8. A method comprising:
generating a set of instructions to perform a core function associated with an XML object and a data resource to be used thereby based on transformation of an XSD schema object structure into the set of instructions, the set of instructions being written in at least one of: a machine language, an assembly language and a high-level language, and the XSD schema object structure comprising relations between XML objects of an XML schema in a quality system;
natively computing the XML schema and the XML object through executing the set of instructions through a processor of a quality system using a memory of the quality system communicatively coupled with the processor;
associating the natively computed XML schema and the XML object to an industrial automation object of an industrial automation process modeled based on a BPMN methodology;
generating an XML-transport map based on the natively computed XML schema, the XML-transport map listing every variable in the natively computed XML schema along with a memory address thereof;
dynamically creating a user interface for any object type through the XML-transport man;
associating the natively computed XML object with the data resource based on the natively computed XML schema;
through the created user interface, customizing and processing the natively computed XML object according to characteristics of the industrial automation object;
modeling a transaction of the industrial automation object with an XML transaction associated with the natively computed XML object;
preparing the XML transaction for the natively computed XML object by saving the natively computed XML object and utilizing a transaction-save-function to evaluate an identification data of the natively computed XML object to determine that the natively computed XML object is referenced properly after saving; and
modifying the natively computed XML object and the associated data resource in response to a modification in the industrial automation process by way of a modification in the industrial automation object and an associated industrial automation resource in accordance with, even prior to a relational database of the quality system being changed to reflect the modification in the industrial automation object:
automatically one of: updating and recalculating dependency structures defined in the natively computed XML schema; and
automatically one of: rebuilding and refreshing an application code of the natively computed XML object.

9. The method of claim 8, further comprising:
saving the natively computed XML object to the relational database of the quality system, where a number of tables is used for XSD elements comprising at least one of a complex type element, a sequence, a referenced element, a referenced attribute, and a simple type element, the natively computed XML object being an XSD element.

10. The method of claim 8, further comprising:
creating quality documentation based on the industrial automation process with the industrial automation object modeled by the natively computed XML object and the associated industrial automation resource modeled by the data resource associated with the natively computed XML object.

11. The method of claim 8, further comprising:
creating a second XML object based on the natively computed XML schema when the industrial automation process is modified.

12. The method of claim 9, further comprising:
associating the second XML object with a second data resource based on at least one of: the natively computed XML schema, the natively computed XML object and the associated data resource in accordance with modeling of a new industrial automation object related to the modification of the industrial automation process.

13. The method of claim 12, further comprising:
referencing the second XML object with the second data resource to the natively computed XML object with the associated data resource in accordance with the modeling of the new industrial automation project.

14. The method of claim 12, further comprising, in accordance with the modeling of the new industrial automation project:
initializing the second XML object based on the natively computed XML object; and
initializing the second data resource based on the data resource associated with the natively computed XML object.

15. The method of claim 12, further comprising, in accordance with the modeling of the new industrial automation project:
creating the second XML object with the second data resource by copying the natively computed XML object with the associated data resource.

16. The method of claim 12, further comprising, in accordance with the modeling of the new industrial automation project:
perform operations on the natively computed XML object and the second XML object jointly; and
perform operations on the data resource associated with the natively computed XML object and the second data resource jointly.

17. The method of claim 9, further comprising:
modifying the relational database with at least one of a new table, a new column and a new row to allow an association thereof to at least one of a new XML object and a new data resource.

18. A quality system comprising:
a processor; and
a memory communicatively coupled with the processor, the processor being configured to execute instructions to:
generate a set of instructions to perform a core function associated with an XML object and a data resource to be used thereby based on transformation of an XSD schema object structure into the set of instructions, the set of instructions being written in at least one of: a machine language, an assembly language and a high-level language, and the XSD schema object structure comprising relations between XML objects of an XML schema in a quality system,
natively compute the XML schema and the XML object through executing the set of instructions,
associate the natively computed XML schema and the XML object to an industrial automation object of an industrial automation process modeled based on a BPMN methodology,
generate an XML-transport map based on the natively computed XML schema, the XML-transport map listing every variable in the natively computed XML schema along with a memory address thereof,
dynamically create a user interface for any object type through the XML-transport map,
associate the natively computed XML object with the data resource based on the natively computed XML schema,
through the created user interface, customize and process the natively computed XML object according to characteristics of the industrial automation object,
model a transaction of the industrial automation object with an XML transaction associated with the natively computed XML object,
prepare the XML transaction for the natively computed XML object by saving the natively computed XML object and utilizing a transaction-save-function to evaluate an identification data of the natively computed XML object to determine that the natively computed XML object is referenced properly after saving, and
modify the natively computed XML object and the associated data resource in response to a modification in the industrial automation process by way of a modification in the industrial automation object and an associated industrial automation resource in accordance with, even prior to a relational database of the quality system being changed to reflect the modification in the industrial automation object:
automatically one of: updating and recalculating dependency structures defined in the natively computed XML schema, and
automatically one of: rebuilding and refreshing an application code of the natively computed XML object.

19. The quality system of claim 18, wherein the processor is further configured to execute instructions to:
save the natively computed XML object to the relational database, where a number of tables is used for XSD elements comprising at least one of a complex type element, a sequence, a referenced element, a referenced attribute, and a simple type element, the natively computed XML object being an XSD element.

20. The quality system of claim 18, wherein the processor is further configured to execute instructions to:
create quality documentation based on the industrial automation process with the industrial automation object modeled by the natively computed XML object and the associated industrial automation resource modeled by the data resource associated with the natively computed XML object.

* * * * *